(12) United States Patent
Gibson et al.

(10) Patent No.: US 11,648,970 B2
(45) Date of Patent: May 16, 2023

(54) CONVERTIBLE, ALL-TERRAIN GEAR CART

(71) Applicants: Bryce Gibson, Dedham, MA (US); Kurt MacLaurin, Lincoln, MA (US)

(72) Inventors: Bryce Gibson, Dedham, MA (US); Kurt MacLaurin, Lincoln, MA (US)

(*) Notice: Subject to any disclaimer, the term of this patent is extended or adjusted under 35 U.S.C. 154(b) by 147 days.

(21) Appl. No.: 17/198,678

(22) Filed: Mar. 11, 2021

(65) Prior Publication Data

US 2022/0289261 A1    Sep. 15, 2022

(51) Int. Cl.
| | |
|---|---|
| *B62B 1/20* | (2006.01) |
| *B62B 1/00* | (2006.01) |
| *B62B 1/22* | (2006.01) |
| *B62B 5/00* | (2006.01) |
| *B62B 5/06* | (2006.01) |

(52) U.S. Cl.
CPC ............... *B62B 1/20* (2013.01); *B62B 1/008* (2013.01); *B62B 1/22* (2013.01); *B62B 5/0079* (2013.01); *B62B 5/067* (2013.01)

(58) Field of Classification Search
CPC .. B62B 1/20; B62B 1/008; B62B 1/22; B62B 5/0079; B62B 5/067
See application file for complete search history.

(56) References Cited

U.S. PATENT DOCUMENTS

| | | |
|---|---|---|
| 4,593,840 A | 6/1986 | Chown |
| 4,938,399 A | 7/1990 | Hull et al. |
| 5,029,740 A | 7/1991 | Cox |
| 5,732,866 A | 3/1998 | Janek |
| 5,826,768 A | 10/1998 | Gamulo |
| 5,853,189 A * | 12/1998 | Swartzlander ............ B62B 1/20 |
| | | 280/47.24 |
| 6,039,227 A | 3/2000 | Stark |
| 6,705,821 B2 | 3/2004 | Philipps et al. |
| 6,746,037 B1 | 6/2004 | Kaplenski et al. |
| 6,802,441 B1 | 10/2004 | DuRant et al. |
| 6,846,017 B2 | 1/2005 | Martin |
| 6,935,656 B2 | 8/2005 | Stout |
| 6,948,732 B2 | 9/2005 | Amacker |

(Continued)

FOREIGN PATENT DOCUMENTS

| | | |
|---|---|---|
| AT | 521332 A1 | 12/2019 |
| EP | 0068436 A2 | 1/1983 |
| WO | WO2019006557 A1 | 1/2019 |

*Primary Examiner* — Bryan A Evans
(74) *Attorney, Agent, or Firm* — O'Connell Law Firm; Thomas P. O'Connell

(57) ABSTRACT

A convertible, all-terrain gear cart convertible between modes of manual propulsion, trailering, and support by a motor vehicle. A control arm with a trailer hitch connector permits trailering or manual propulsion and is pivotally coupled to a first end of a cargo bin, and a vehicle engaging member to permit support and transport by a motor vehicle projects from the second end of the cargo bin. Detachable, all-terrain wheels with lateral axes of rotation are retained at a mid-portion of the cargo bin. Cargo retention and roll bars are removably coupled to the cargo bin, and a retractable support leg can cooperate with the wheels to stabilize the gear cart. The vehicle engaging member can comprise a receiver with a mitered end forming a shelf that can be rested on a rigid tongue of a trailer hitch adapter to permit levering of the gear cart relative to a vehicle.

30 Claims, 17 Drawing Sheets

(56) References Cited

U.S. PATENT DOCUMENTS

| | | |
|---|---|---|
| 7,172,207 B2 | 2/2007 | Henry |
| 7,341,417 B1 | 3/2008 | Lohr |
| 7,641,235 B1 | 1/2010 | Anduss |
| 7,823,906 B2 | 11/2010 | Darling, III |
| 8,505,932 B1 * | 8/2013 | Piccirillo ............... B62K 27/02 |
| | | 280/30 |
| 8,505,959 B2 | 8/2013 | Darling, III |
| 8,985,418 B1 | 3/2015 | Poudrier |
| 9,789,804 B2 | 10/2017 | Brinkley et al. |
| 10,053,128 B2 | 8/2018 | Rackleff et al. |
| 10,071,757 B1 | 9/2018 | Cheatham et al. |
| 10,131,371 B2 | 11/2018 | Camarco et al. |
| 10,562,463 B1 | 2/2020 | Speer et al. |
| 2001/0014272 A1 | 8/2001 | Ochoa et al. |
| 2002/0063142 A1 | 5/2002 | Williams et al. |
| 2004/0173654 A1 | 9/2004 | McAlister |
| 2006/0145461 A1 | 7/2006 | Anderson |
| 2006/0151555 A1 | 7/2006 | Mills |
| 2007/0126192 A1 | 6/2007 | Thomas |
| 2008/0111348 A1 | 5/2008 | Lawson |
| 2008/0150245 A1 * | 6/2008 | Clatt ...................... B63C 11/02 |
| | | 280/47.24 |
| 2008/0150253 A1 | 6/2008 | Crawford et al. |
| 2008/0247855 A1 | 10/2008 | Lee et al. |
| 2008/0296330 A1 | 12/2008 | Kalous et al. |
| 2009/0038558 A1 | 2/2009 | Schulte |
| 2009/0152314 A1 | 6/2009 | Myrex |
| 2009/0230642 A1 | 9/2009 | Thomas |
| 2009/0232633 A1 | 9/2009 | Stamps et al. |
| 2010/0066069 A1 | 3/2010 | Bradshaw |
| 2010/0155443 A1 | 6/2010 | Lasater |
| 2010/0260587 A1 | 10/2010 | LeAnna |
| 2010/0320739 A1 | 12/2010 | Kittrell |
| 2015/0122859 A1 | 5/2015 | Brinkley et al. |
| 2016/0368516 A1 * | 12/2016 | Devers ................... B62B 5/067 |

* cited by examiner

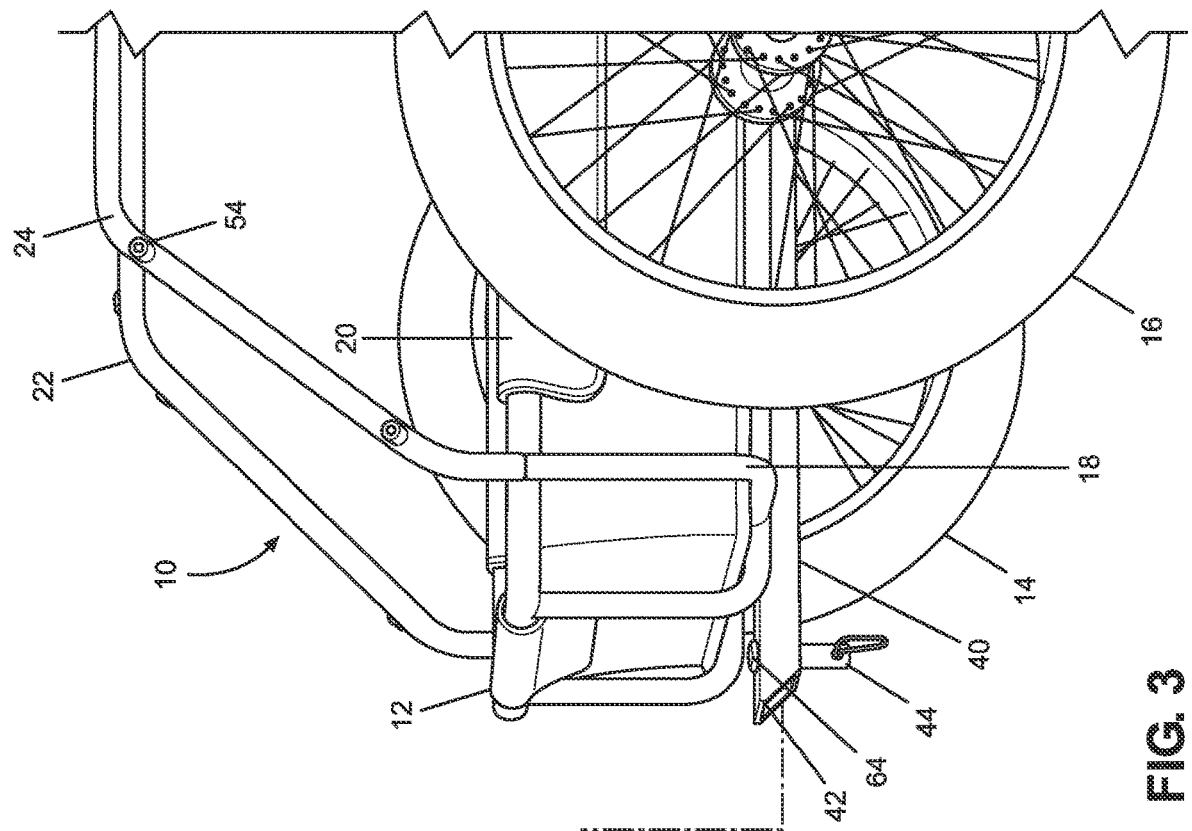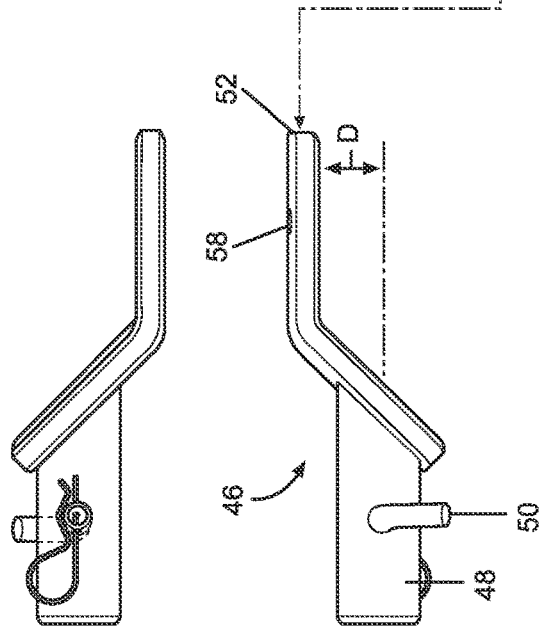
FIG. 3

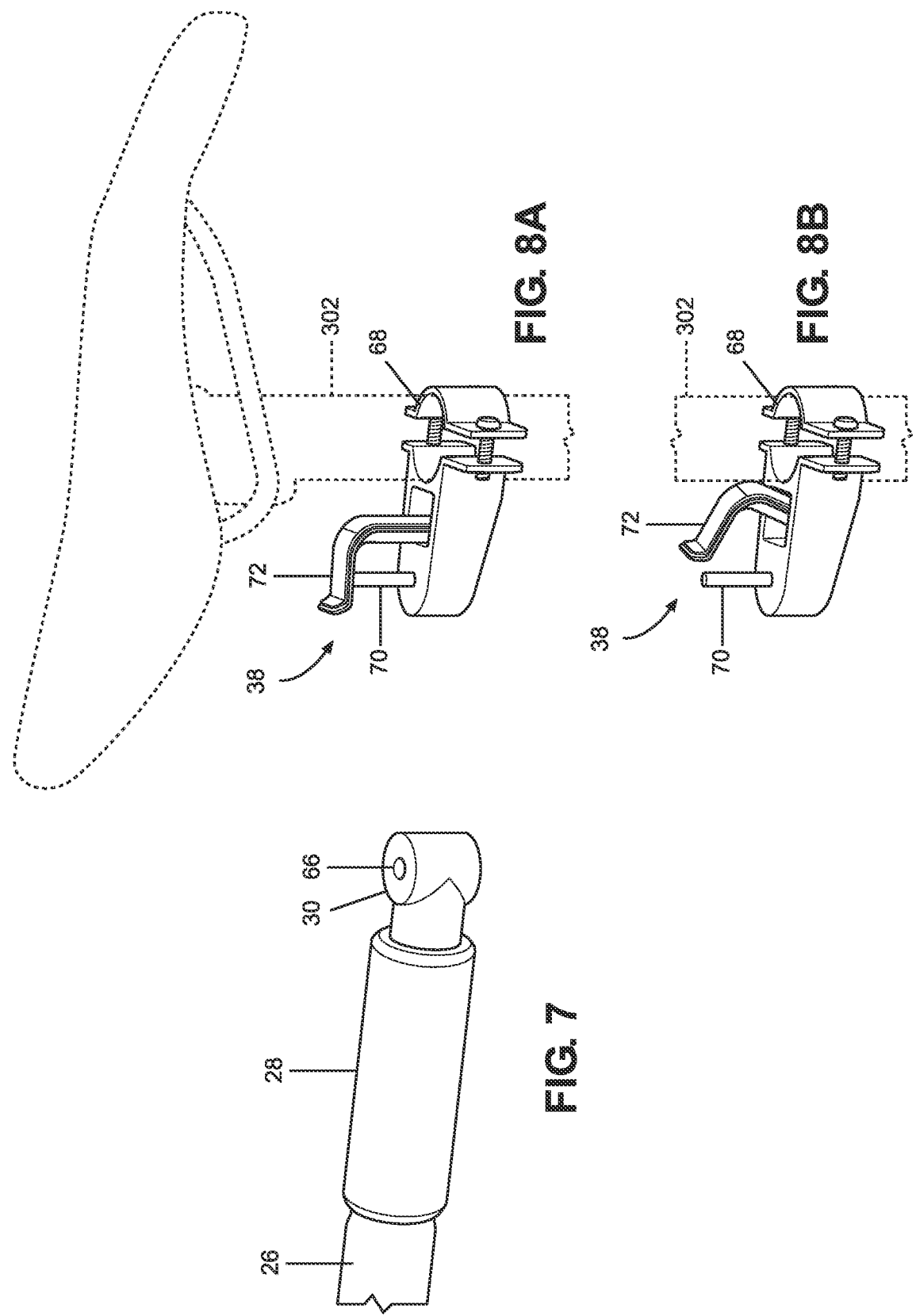

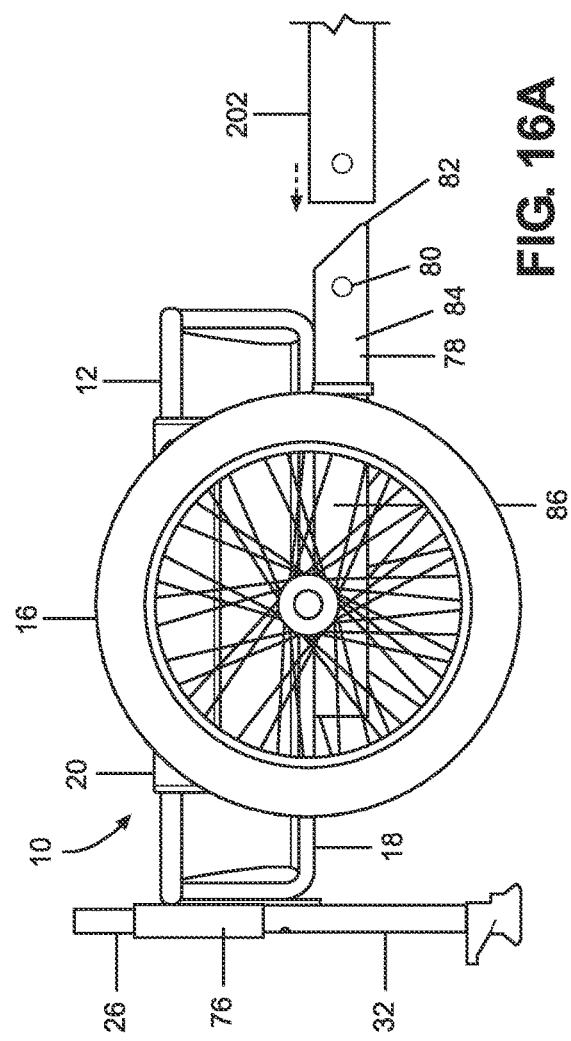
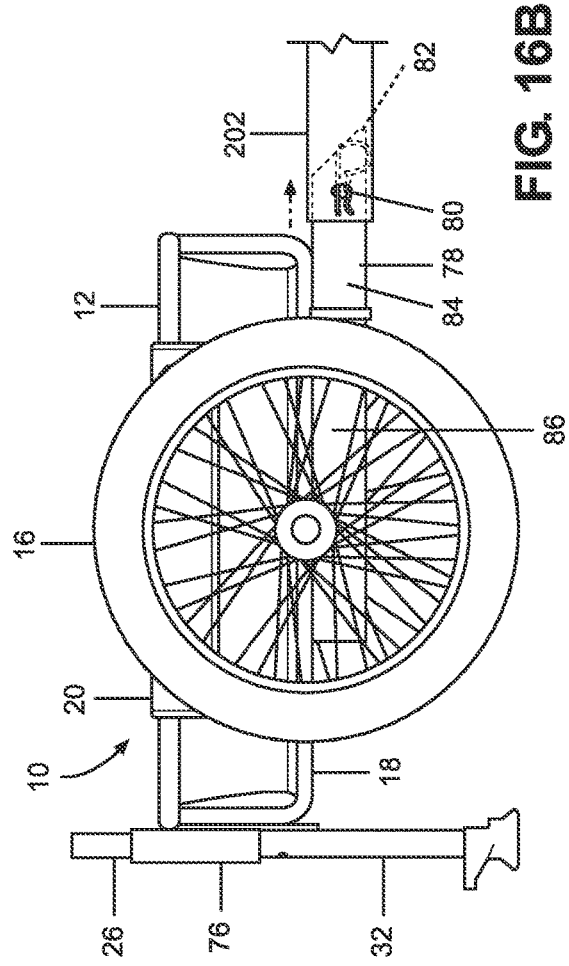

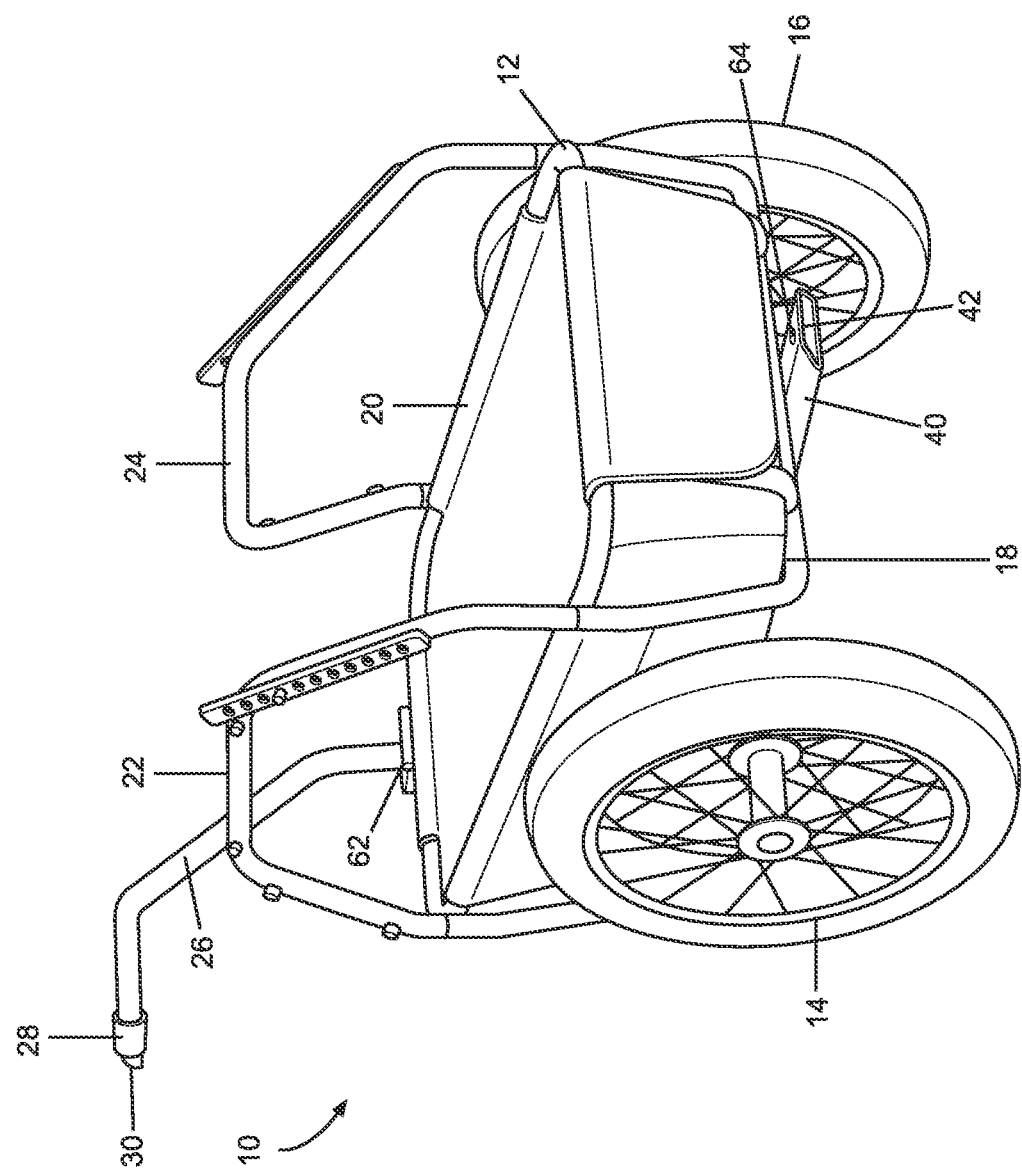

CONVERTIBLE, ALL-TERRAIN GEAR CART

FIELD OF THE INVENTION

The present invention relates generally to wheeled vehicles. More particularly, disclosed herein is a convertible, all-terrain gear cart that can be readily converted between modes of manual propulsion, trailering, and support by a motor vehicle and that can be stably and reliably levered into and out of supported engagement with a trailer hitch of a motor vehicle exploiting mechanical advantages provided by handle and wheel geometry and hitch adapter construction.

BACKGROUND OF THE INVENTION

There are many circumstances where it is desirable to store and transport cargo. A person traveling on foot might seek to haul skis, skates, or other sports gear to the base of a mountain or to a skating rink or to an athletic field, or one may wish to transport fishing or beach supplies over hard and soft surfaces to a final destination at a beach. In other circumstances, such as the rock climber traveling to a rock face or the mountain biker trekking to a remote camping location, a person may wish to pull heavy equipment and supplies behind a bicycle. That same person may have a need to transport goods and a transport vehicle for such goods to and from a given location, such as the departure point for a hike or a mountain biking trek or the general location of a beach or athletic field. With an understanding of the foregoing, the present inventors have appreciated that there is a real need for a multi-functional cart that can traverse substantially any terrain and that can be readily converted between modes of manual propulsion, trailering behind a bicycle, and support and transportation by a motor vehicle.

The prior art has disclosed convertible cargo carriers. For instance, with U.S. Pat. No. 8,985,418, Poudrier taught a Convertible Cargo Carrier Cart System that can be towed behind a bicycle, pulled by a person on foot, or engaged with a trailer hitch of a vehicle for transport. While advantageous for its adaptability, the convertible cart in Poudrier exhibits a number of limitations common to many such convertible carts. Although the cart system can be pulled by a bicycle or supported by a vehicle trailer hitch, the cart system appears to rely on the sheer strength of the user to lift the entire cart and any articles supported thereby from a ground surface and into engagement with the vehicle trailer hitch. Moreover, apart from guide members that can be selectively engaged with the cart, little or no provision is made for retaining and transporting articles. Still further, the system appears to require the attachment of supplementary components for conversion between modes while relying on a bicycle towing configuration whose structure and operation are at best marginally disclosed.

A further convertible transport system, entitled Curved Load Support for Use on a Vehicle, is taught by U.S. Pat. No. 9,789,804 to Brinkley et al. There, a wheeled cart can be manually propelled by use of a handle, or it can be engaged to be carried by a vehicle by a user's engaging a channel member of the cart with a support bar that extends from a vehicle hitch receiver and then pivoting and sliding the channel member and cart into position supported by the support bar and, therefore, by the vehicle. Brinkley thus proposes a solution to the need to lift the entire weight of a cart into position to be supported by a vehicle. However, the convertibility of the cart is limited between a simple hand cart and a hitch-mounted carrier. No structure or function is apparently provided to permit towing by a bicycle. Furthermore, the cart is essentially limited to use as a hand truck with no accommodation provided in the manual propulsion mode to enable the retention of articles in an elevated, stabilized manner. Still further, engagement of the wheeled cart with a trailer hitch of a vehicle requires adroitly engaging the channel member with the support bar, which can be challenging with a substantial risk of inadvertent disengagement.

A similar, and similarly limited, structure for supporting bicycles is disclosed by U.S. Pat. No. 10,562,463 to Speer et al. for a Vehicle Load Carrier with Integrated Handling Wheels. There, the user is expected to pivot and align a square-ended hitch bar with a conventional trailer hitch receiver of a motor vehicle. While the proposed system attempts to provide advantage by not requiring a user to lift the entire weight of the rack or carrier by pivoting the rack or carrier into place, there is a real risk of the hitch bar becoming inadvertently disengaged from the trailer hitch during pivoting by the need to keep the square-ended hitch bar in engagement with the square-ended trailer hitch receiver. There is perhaps an even greater risk of inadvertent, premature disengagement of the hitch bar from the trailer hitch receiver during removal of the rack or carrier where the distal end of the hitch bar may not be perceived by the user. Apart from the frustration such disengagement would engender, there would also be risk of injury to the user and damage to the vehicle or any supported bicycles.

Further attachable cart structures are known, including the Attachable Cart System and Method of U.S. Pat. No. 10,131,371 to Camarco et al. and the Vehicle Hitch Attachable Transporting Dolly of U.S. Pat. No. 7,641,235 to Anduss. These carts, although convertible from hand propulsion to vehicle-supported configurations, require complex raising and lowering mechanisms, and they do not contemplate enabling towing of the carts by a bicycle.

It is thus apparent that, despite the attempts of the prior art to provide multi-functional, convertible transportation devices, there remains a need in the art for an all-terrain convertible gear cart that is efficient and elegant in structure and operation to enable ready conversion between modes of manual propulsion, bicycle trailering, and motor vehicle support and transportation.

SUMMARY OF THE INVENTION

In view of the needs left by the prior art, the present invention is founded on the basic object of providing a multi-functional gear cart that can be converted between modes of manual propulsion, trailering, and support by a motor vehicle.

A more particular object of embodiments of the invention is to provide a convertible gear cart that can be stably and reliably pivoted into and out of supported engagement with a trailer hitch of a vehicle with minimized risk of inadvertent disengagement.

Another particular object of embodiments of the invention is to provide a convertible gear cart that is adapted for traversing varied terrain when propelled manually and when towed by a bicycle or other vehicle.

A further object of embodiments of the invention is to provide a convertible gear cart that is efficient and elegant in structure and operation within individual modes of function and during intermodal conversion.

Another particular object of embodiments of the invention is to provide a convertible gear cart that can stably support and transport varied cargo.

Yet another particular object of embodiments of the invention is to provide a convertible gear cart that can retain and support articles in an elevated, stabilized manner, including when in a manual propulsion mode.

Still another object of the invention in certain embodiments is to provide a convertible gear cart that can protect and retain supported articles within a protective cage structure.

These and further objects, advantages, and details of the present invention will become obvious not only to one who reviews the present specification and drawings but also to those who have an opportunity to make use of an embodiment of the convertible, all-terrain gear cart disclosed herein. Although the accomplishment of each of the foregoing objects in a single embodiment of the invention may be possible and indeed preferred, not all embodiments will seek or need to accomplish each and every potential advantage and function. Nonetheless, all such embodiments should be considered within the scope of the present invention.

In carrying forth one or more objects of the invention, one embodiment of the convertible, all-terrain gear cart is founded on a cargo bin with a first end, a second end, a first side, and a second side. A control arm has a proximal segment coupled to the cargo bin and a distal segment that retains a trailer hitch connector to enable the gear cart to be trailered by a trailering vehicle. A vehicle engaging member, which could for instance comprise a receiver or a retaining post, is retained by the cargo bin. Where the cargo bin is considered to have a longitudinal centerline that communicates from the first end to the second end of the cargo bin, the proximal segment of the control arm and the vehicle engaging member can be disposed in alignment with the longitudinal centerline. The vehicle engaging member has a distal end adjacent to the second end of the cargo bin adapted for being retained and supported by a trailer hitch receiver of a vehicle whether directly or through mutual engagement with a trailer hitch adapter. Still further, first and second wheels, which can be detachable, are rotatably retained at a mid-portion of the cargo bin with aligned, lateral axes of rotation.

Under the foregoing construction, the gear cart can be readily propelled manually, such as by a gripping of the distal segment of the control arm. Alternatively, by connection of the trailer hitch connector of the control arm to a corresponding trailer hitch connector retained by a trailering vehicle, the all-terrain gear cart can be readily towed by a bicycle or other trailering vehicle. Still further, by engagement of the vehicle engaging member with a trailer hitch receiver of a motor vehicle, whether directly or through mutual engagement with a trailer hitch adapter, the all-terrain gear cart can be stably supported and transported by the motor vehicle.

Embodiments of the convertible, all-terrain gear cart can further include first and second cargo retention and roll bars, and the cargo bin can be adapted to retain the first and second cargo retention and roll bars to project from the cargo bin. For instance, the first and second cargo retention and roll bars can be generally U-shaped with a central segment and first and second legs that project from the central segment. Each of the first and second legs of each cargo retention and roll bar can terminate in a tip segment, and tip receivers can then be disposed on the cargo bin in correspondence with the tip segments of the first and second legs of the cargo retention and roll bars. In certain practices of the invention, the cargo bin can be constructed as a cargo cage formed by a plurality of frame portions of rigid members, and the tip receivers disposed on the cargo bin in correspondence with the tip segments of the first and second legs of the cargo retention and roll bars can comprise tip segments of frame portions of the rigid members that form the cargo cage.

Still further, as disclosed herein, plural retaining members can be spaced along each roll bar, and a plurality of retaining straps can be provided that are adapted to engage the retaining members spaced along the roll bars. With that, widely varied cargo can be retained and protected by the combined functionalities of the cargo bin, the roll bars, and the retaining straps. Where the cargo bin comprises a cargo cage formed by a plurality of frame portions of rigid members to define an inner volume, the gear cart can further include a cargo liner shaped and sized in correspondence to the inner volume defined by the cargo cage. Moreover, plural pockets or sleeves can be spaced along the interior wall surface of the cargo liner to permit the further retention and stabilization of cargo, including elongate articles such as skis, hockey sticks, umbrellas, or any other elongate article.

In embodiments of the gear cart as disclosed herein, a retractable support leg can be retained by the cargo bin. The support leg has a retracted position adjacent to the cargo bin and an extended position wherein the support leg extends from the cargo bin. The support leg can be retractable in any effective manner, including by pivoting, by longitudinal sliding, or any other method.

The control arm is pivotally coupled to the cargo bin to be pivotable between a use position wherein the control arm extends from the cargo bin and a storage position wherein the control arm overlies the cargo bin. In particular embodiments of the gear cart, the distal segment of the control arm is disposed at an approximately 90-degree angle relative to the proximal segment of the control arm. With that, where the gear cart is presumed to be in an upright orientation, the control arm can pivot about a vertical pivot axis while the distal segment is disposed generally horizontally for manual propulsion or for trailering connection to a trailering vehicle. The distal segment of the control arm can be adjustable in height relative to the cargo bin, such as but not limited to by the proximal segment of the control arm being adjustably received in a control arm receiving tube or by the control arm itself being extendable, such as along a central segment thereof.

According to embodiments of the invention, the vehicle engaging member can take the form of a receiver, and a trailer hitch adapter can be provided for being retained by the trailer hitch receiver of the vehicle. The trailer hitch adapter can have a rigid tongue, and the vehicle engaging member can have an opening adapted to receive the rigid tongue of the trailer hitch adapter.

In further refined embodiments of the gear cart, the vehicle engaging member has a shelf portion that extends distally beyond the opening adapted to receive the rigid tongue of the trailer hitch adapter. With that, the shelf portion of the vehicle engaging member can be rested atop the rigid tongue of the trailer hitch adapter to permit the cargo bin to be pivoted using the rigid tongue as a fulcrum. By way of example and not limitation, the vehicle engaging member can comprise a rigid sleeve of rectangular cross section, and the distal end of the vehicle engaging member can be mitered to have a recessed lower portion and an overhanging upper portion that projects distally beyond the recessed lower portion to form the shelf portion. Further stability during pivoting can be provided where the opening of the vehicle engaging member and the rigid tongue have width dimensions greater than height dimensions. Broad, flat surfaces of the rigid tongue and the shelf portion can thus further prevent inadvertent tilting or disengagement of the gear cart relative to the motor vehicle.

Still further, the trailer hitch adapter can have a bar portion for being received into a trailer hitch receiver of a vehicle. The trailer hitch adapter has a longitudinal centerline, and the rigid tongue can fixedly project from the bar portion in parallel to but offset from the longitudinal centerline by a distance D. Under such constructions, a relative height of the rigid tongue can be adjusted by a distance of twice the distance D by orienting the rigid tongue above or below the bar portion of the trailer hitch adapter.

In other practices of the invention, the vehicle engaging member can take the form of a retaining post, potentially formed with a first sleeve extendably and retractably engaged with a second sleeve. The retaining post has a body portion and a distal end with a shelf portion that extends distally beyond the body portion. With that, the shelf portion of the vehicle engaging member can be rested directly within the trailer hitch receiver of the vehicle to permit the cargo bin to be pivoted using the trailer hitch receiver as a fulcrum. More particularly, the body portion of the retaining post can have a lower portion and an upper portion, and the shelf portion can extend distally from the lower portion of the retaining post beyond the upper portion of the retaining post. Still more particularly, the distal end of the retaining post can be mitered to have a recessed upper portion and an extended lower portion that projects distally beyond the recessed upper portion to form the shelf portion. The extended lower portion thus comprises the shelf portion that can be exploited to render pivoting into engagement with the trailer hitch receiver of the vehicle more convenient and less prone to inadvertent disengagement.

One will appreciate that the foregoing discussion broadly outlines the more important goals and features of the invention to enable a better understanding of the detailed description that follows and to instill a better appreciation of the inventors' contribution to the art. Before any particular embodiment or aspect thereof is explained in detail, it must be made clear that the following details of construction and illustrations of inventive concepts are mere examples of the many possible manifestations of the invention.

BRIEF DESCRIPTION OF THE DRAWINGS

In the accompanying drawing figures:

FIG. 3 is a lateral perspective view of the convertible, all-terrain gear cart of FIG. 1;

FIG. 7 is a perspective view of the handle and control arm hitch connector portions of the control arm for a convertible, all-terrain gear cart according to the invention;

FIGS. 8A and 8B are perspective views of bicycle hitch connector portions for a convertible, all-terrain gear cart as disclosed herein;

FIGS. 16A and 16B are further progressive views in side elevation of the engagement of the convertible, all-terrain gear cart of FIG. 12 with a motor vehicle;

FIG. 18 is an alternative perspective view of the convertible, all-terrain gear cart of FIG. 17.

DETAILED DESCRIPTION OF PREFERRED EMBODIMENTS

Figure 1:
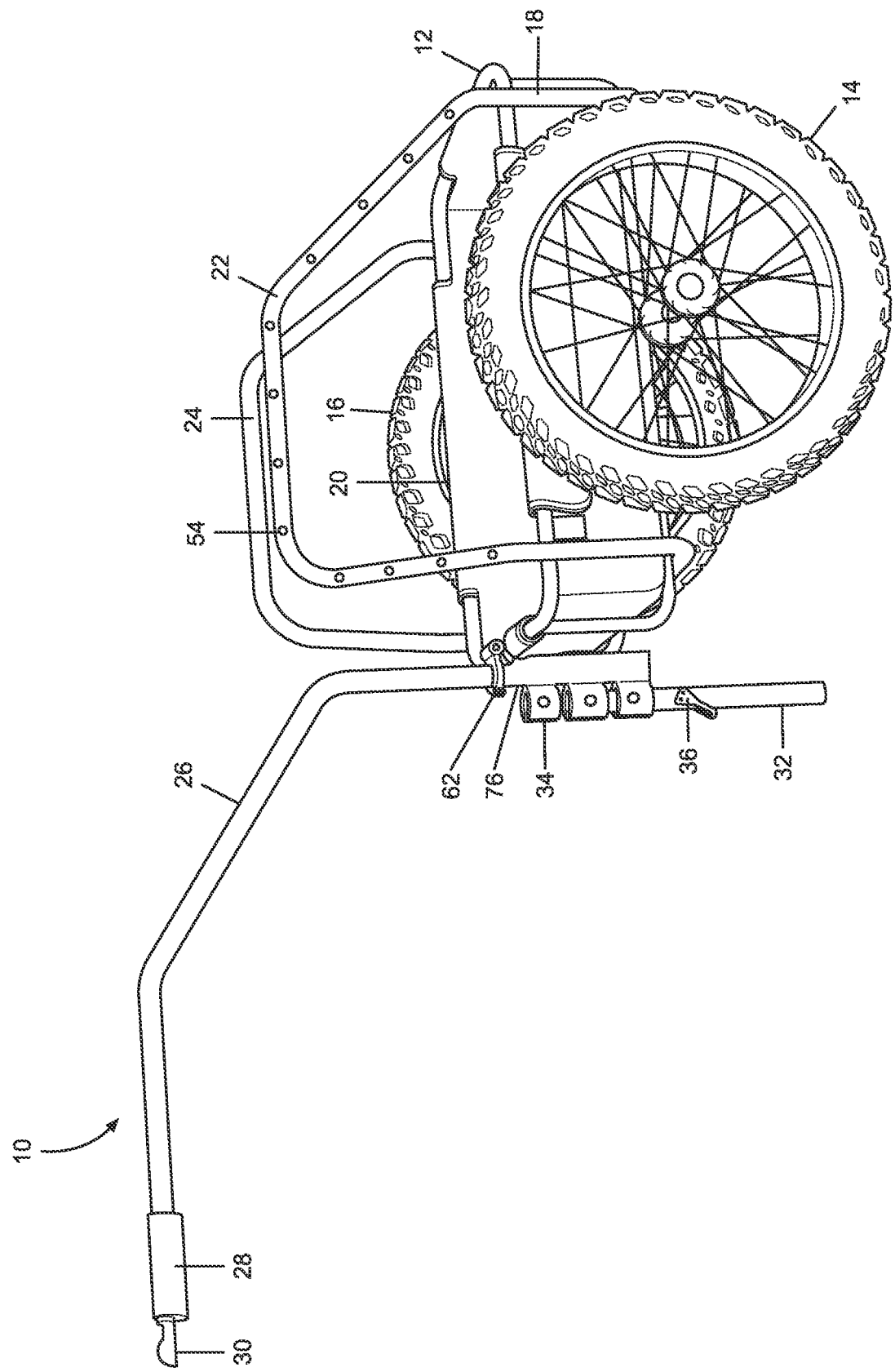
FIG. 1 is a perspective view of a convertible, all-terrain gear cart according to the present invention.

To ensure that one skilled in the art will be able to understand and, in appropriate cases, practice the present invention, certain preferred embodiments of the convertible, all-terrain gear cart revealed herein are described below and shown in the accompanying drawing figures. It will be understood, however, that the convertible, all-terrain gear cart is subject to a variety of further embodiments, each within the scope of the invention.

Looking more particularly to the drawings, embodiments of a convertible, all-terrain gear cart according to the present invention are indicated generally at 10 in FIGS. 1 through 6. There, the gear cart 10 can be considered to be founded on a cargo bin 12 with a first end, a second end, a first side, and a second side. A control arm 26 with a handle 28 is pivotally coupled to the first end of the cargo bin 12, and a slot receiver 40 is disposed to project from below the second end of the cargo bin 12. Both the control arm 26 and the receiver 40 are disposed in alignment with a longitudinal centerline of the cargo bin 12 and the convertible, all-terrain gear cart 10 in general. First and second accessory attachment and retention structures, which in this embodiment comprise cargo retention and roll bars 22 and 24, project upwardly from the first and second sides of the cargo bin 12, and a retractable support leg 32 is pivotally coupled to the first end of the cargo bin 12 in general alignment with the longitudinal centerline of the cargo bin 12. The gear cart 10 is supported for manual propulsion or trailering by first and second all-terrain wheels 14 and 16 that are rotatably retained at a mid-portion of the cargo bin 12 with aligned, lateral axes of rotation that are orthogonal to the longitudinal centerline of the gear cart 10. The all-terrain wheels 14 and 16 are readily detachable from the cargo bin 12, such as by spring-loaded mechanisms actuated by buttons disposed on the hubs of the wheels 14 and 16.

The cargo bin 12 in the depicted embodiment is formed with a cargo cage 18 that defines an inner cargo storage volume. Here, the inner cargo storage volume defined by the cargo cage 18 is rectangular in lateral cross section to have a length, a width, and a depth. The cargo cage 18 in this example has an upper rectangular frame portion, a lower rectangular frame portion, first and second spaced apart U-shaped longitudinal frame portions, and first and second spaced apart U-shaped lateral frame portions. Each of the frame portions is formed by one or more segments of rigid tubing, such as metal tubing. The frame portions are fixed together to form the cargo cage 18, such as by welding, by mechanical fasteners, or by any other effective method or combination thereof. The tip segments of the upturned first and second legs of each longitudinal frame portion are fixed to laterally communicating segments of the upper rectangular frame portion. The tip segments of the upturned first and second legs of each lateral frame portion are exposed and open and are fixed laterally outboard of longitudinally communicating segments of the upper rectangular frame portion.

A cargo liner 20 is received and retained by the cargo cage 18. In the present embodiment, the cargo liner 20 is rectangular in lateral cross section and substantially corresponds to the shape and size of the interior space bounded by the cargo cage 18. The cargo liner 20 has flap portions that overlie the lateral and longitudinal segments of the upper frame portion of the cargo cage 18 while a bottom of the cargo liner 20 is supported by the lower rectangular frame portion and the central segments of the U-shaped lateral and longitudinal frame portions of the cargo cage 18. The cargo liner 20 can be formed of one or more layers of flexible material, such as rubber, canvas, or any other suitable material or combination thereof. Alternatively, the cargo liner 20 can be formed of a rigid or semi-rigid material, such as a plastic or metal.

Figure 4:
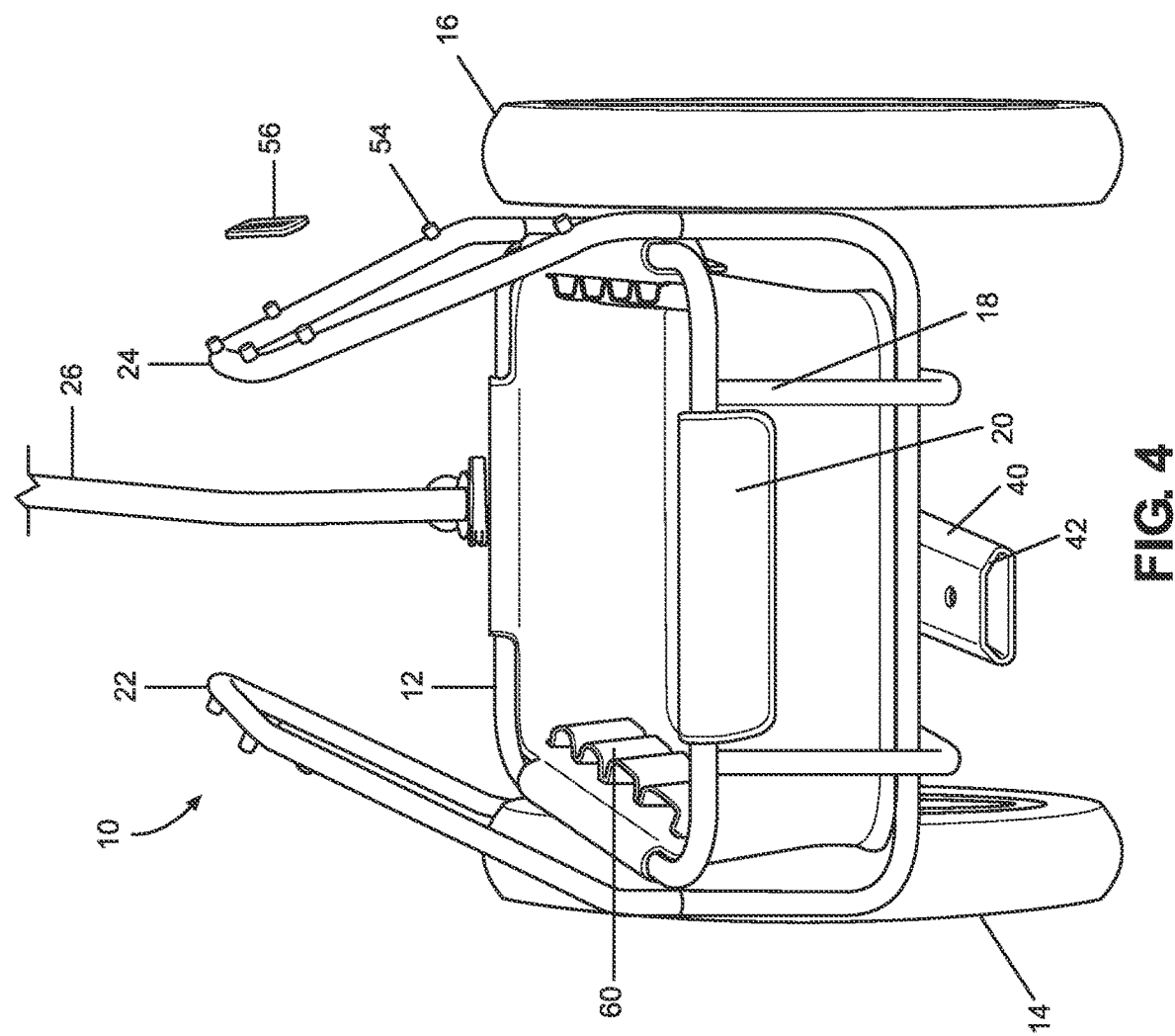
FIG. 4 is an alternative perspective view of the convertible, all-terrain gear cart of FIG. 1.
Figure 5:
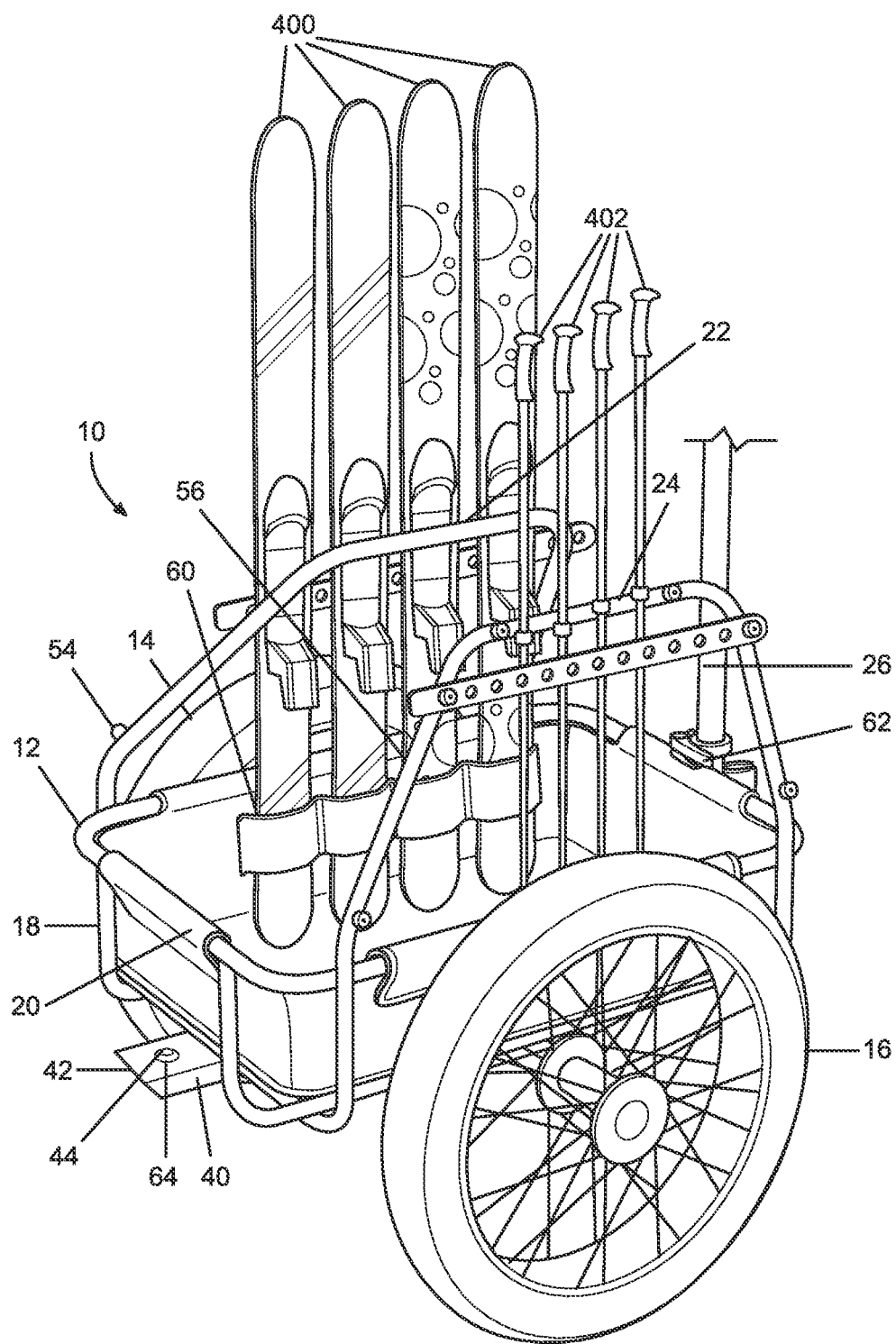
FIG. 5 is a further perspective view of the convertible, all-terrain gear cart of FIG. 1.

As best seen in FIGS. 4 and 5, for instance, plural pockets and sleeves 60 are spaced along the interior walls of the cargo liner 20. The pockets and sleeves 60 can be employed for receiving and retaining cargo. For instance, smaller articles can be inserted into a selected pocket or sleeve 60, and longer articles, such as sporting implements, umbrellas, or any other elongate articles, can employ one or more pockets or sleeves 60 to retain the lower ends thereof.

The first and second cargo retention and roll bars 22 and 24 or other accessory attachment and retention structures 22 and 24 can be removably and replaceably coupled to the cargo bin 12. Here, the roll bars 22 and 24 are generally U-shaped, each with a central segment, a first leg that projects generally perpendicularly to the central segment to terminate in a tip segment, and a second leg that projects from the central segment at an obtuse angle to terminate in a tip segment that is reverse angled to be approximately parallel to the tip segment of the first leg. Other accessory attachment and retention structures are within the scope of the invention. By way of further example and not limitation, the accessory attachment and retention structures 22 and 24 could alternatively be particularly adapted for retaining specific gear, such as snow boards, fishing poles, or any other articles. Also within the scope of the invention, the accessory attachment and retention structures 22 and 24 could be formed as a unit, or they could be crafted to support a storage container or one or more support shelves.

The tip segments of the first and second legs of the roll bars 22 and 24 are sized and spaced to be matingly engaged with the tip segments of the upturned first and second legs of the lateral frame portions of the cargo cage 18. For instance, as shown, the tip segments of the first and second legs of the roll bars 22 and 24 can be matingly received into the tip segments of the lateral frame portions of the cargo cage 18. The first and second legs of the roll bars 22 and 24 have aligned lateral bends therein so that, when the roll bars 22 and 24 are engaged with the cargo cage 18 as in FIG. 4 for example, the roll bars 22 and 24 angle inwardly toward the longitudinal centerline of the gear cart 10. Although not illustrated, the roll bars 22 and 24 can be oppositely disposed to be angled outwardly.

Each cargo retention and roll bar 22 and 24 has a plurality of retaining members 54 spaced therealong. The retaining members 54 can pursue a variety of configurations, such as hooks, posts with broadened tips, snap buttons, or any other effective retaining configuration. The gear cart 10 includes plural retaining straps 56 for engaging the roll bars 22 and 24 and the cargo bin 12 in general to secure articles in relation to the gear cart 10 for transport. In the depicted example, the retaining straps 56 comprise flexible straps, such as rubber straps, with a plurality of fastening apertures spaced therealong for selectively engaging the retaining members 54 of the roll bars 22 and 24. Under this construction, cargo can be retained by suitable placement, stretching, and attachment of the retaining straps 56 and potentially other fastening mechanisms spanning along or between the roll bars 22 and 24 to engage the fastening apertures of the straps 56 with retaining members 54 of the roll bars 22 and 24.

By the combined capabilities provided by the cargo retention and roll bars 22 and 24, the retaining members 54, the retaining straps 56, the sleeves and pockets 60, and the cargo bin 12 in general, a wide variety of cargo can be retained and transported by the all-terrain gear cart 10. By way of illustration, one can perceive by reference to FIG. 2 that hockey sticks 404 or other elongate and otherwise-shaped articles can be retained in a generally horizontal position supported by the roll bars 22 and 24 and fixed in place by the retaining straps 56. Alternatively, as FIG. 5 shows, skis 400 and ski poles 402 or other elongate or otherwise-shaped articles can be retained in a generally vertical position with ends thereof received into the sleeves or pockets 60, again supported by the roll bars 22 and 24 and retained in place by the retaining straps 56. Of course, the cargo that can be retained and transported by use of the gear cart 10 is unlimited as to type so that a person might just as readily retain and transport an umbrella or other gear for the beach, sporting implements for baseball, lacrosse, or any other sport, or gear for hunting or any other activity.

The control arm 26 has a proximal segment retained by the cargo bin 12, a central segment disposed at a non-zero angle relative to the proximal segment, and a distal segment disposed at a non-zero angle relative to the central segment and at a 90-degree angle relative to the proximal segment. With this, the distal segment can pursue a horizontal disposition while the proximal segment is disposed in a vertical disposition. The distal segment of the control arm 26 comprises a handle portion 28 and a trailer hitch connector 30.

The proximal segment of the control arm 26 is pivotally retained in relation to the cargo bin 12 by a control arm receiver tube 76 that is fixed to the first end of the cargo bin 12. In the depicted embodiment, the proximal end of the control arm 26 is matingly received into the control arm receiver tube 76. The control arm 26 is pivotable and adjustable in height in relation to the control arm receiver tube 76 and in relation to the cargo bin 12 in general. Where the cargo bin 12 is considered to be in a horizontal position when disposed as in FIG. 2, the receiver tube 76 is disposed in a vertical orientation, and the control arm 26 is selectively pivotable about a vertical pivot axis in relation to the cargo bin 12.

The control arm 26 can be selectively locked against pivoting and, additionally or alternatively, height adjustment by a locking mechanism 62. The locking mechanism 62 can conversely be employed to permit the control arm 26 to pivot and adjust in height. The locking mechanism 62 could pursue a variety of types. In the example shown in FIG. 2, for instance, the locking mechanism 62 comprises a clamping mechanism for clamping the proximal segment of the control arm 26 in place relative to the receiver tube 76, but numerous other mechanisms 62, such as locking pins, ball and spring detents, or any other effective mechanism, would occur to one skilled in the art after reviewing the present disclosure. Under such constructions, the control arm 26 can, for example, be pivoted 180 degrees from the use position of, for example, FIGS. 1 and 2 to the storage position of, for instance, FIG. 11C. Moreover, by release of the locking mechanism 62, the control arm 26 can be detached from the receiver tube 76 and the cargo bin 12, such as for storage or transport of the all-terrain gear cart 10.

The trailer hitch connector 30 disposed at the distal end of the control arm 26 could pursue different configurations within the scope of the invention. As illustrated, the trailer hitch connector 30 enables a coupling of embodiments of the all-terrain gear cart 10 to a trailering vehicle 300 for trailering as in FIG. 10, for instance. In the accompanying drawings, the trailering vehicle 300 is often depicted as a bicycle 300, but it will be appreciated that the trailer hitch connector 30 could be used to couple the all-terrain gear cart 10 to other manually-propelled or motorized vehicles, including all-terrain vehicles and nearly any other type of vehicle. In any case, the trailer hitch connector 30 is constructed to be selectively engaged with and retained by a corresponding trailer hitch connector 38 fixed to the trailering vehicle 300.

In the embodiment of FIGS. 2, 7, 8A, and 8B, the trailer hitch connector 30 at the distal end of the control arm 26 comprises a rubberized member with a longitudinal proximal rod portion, a distal rod portion formed integrally with and perpendicular to the proximal rod portion, and a receiving aperture 66 that passes centrally through the distal rod portion. The trailer hitch connector 38 for being fixed to the trailering vehicle 300 in this embodiment comprises a clamping portion 68 that is in the current example clamped about the seat post 302 of the bicycle 300. The trailer hitch connector 38 has a fixed retaining member 70, which here comprises a retaining post 70, and a locking arm 72 that can be selectively pivoted into and out of position overlying the distal end of the retaining post 70.

Under this construction, with the trailer hitch connector 38 fixed to the trailering vehicle 300 and the control arm 26 coupled with the cargo bin 12, a trailering connection can be established by inducing the locking arm 72 to a withdrawn position as in FIG. 8B, sliding the receiving aperture 66 of the trailer hitch connector 30 onto the retaining post 70, and then inducing the locking arm 72 to the locking position of FIG. 8A overlying the retaining post 70 and the trailer hitch connector 30. When the trailering connection with the trailering vehicle 300 is no longer required, the trailer hitch connectors 30 and 38 can be readily separated by inducing the locking arm 72 to the withdrawn position of FIG. 8B and sliding the receiving aperture 66 of the trailer hitch connector 30 out of engagement with the retaining post 70.

Figure 9A:
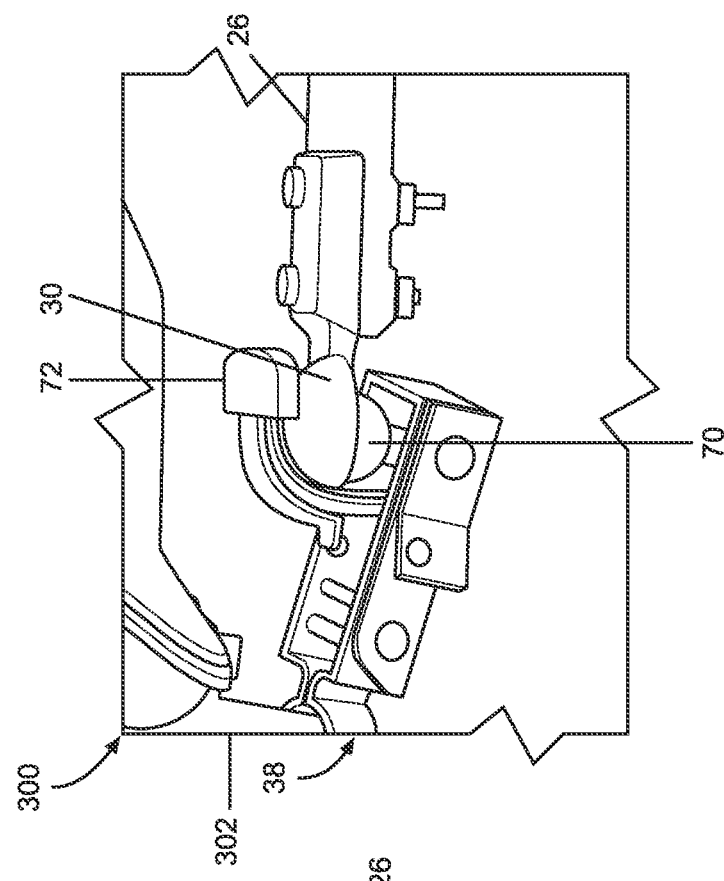
FIGS. 9A and 9B are progressive perspective views of the engagement of alternative bicycle hitch connector portions for a convertible, all-terrain gear cart pursuant to the invention.
Figure 9B:
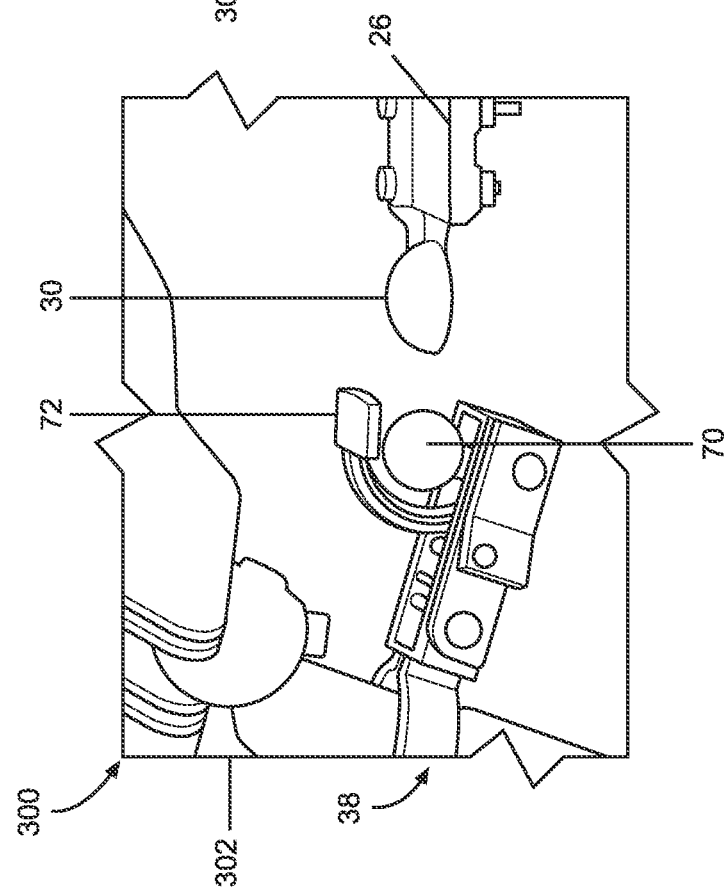
Figure 14:
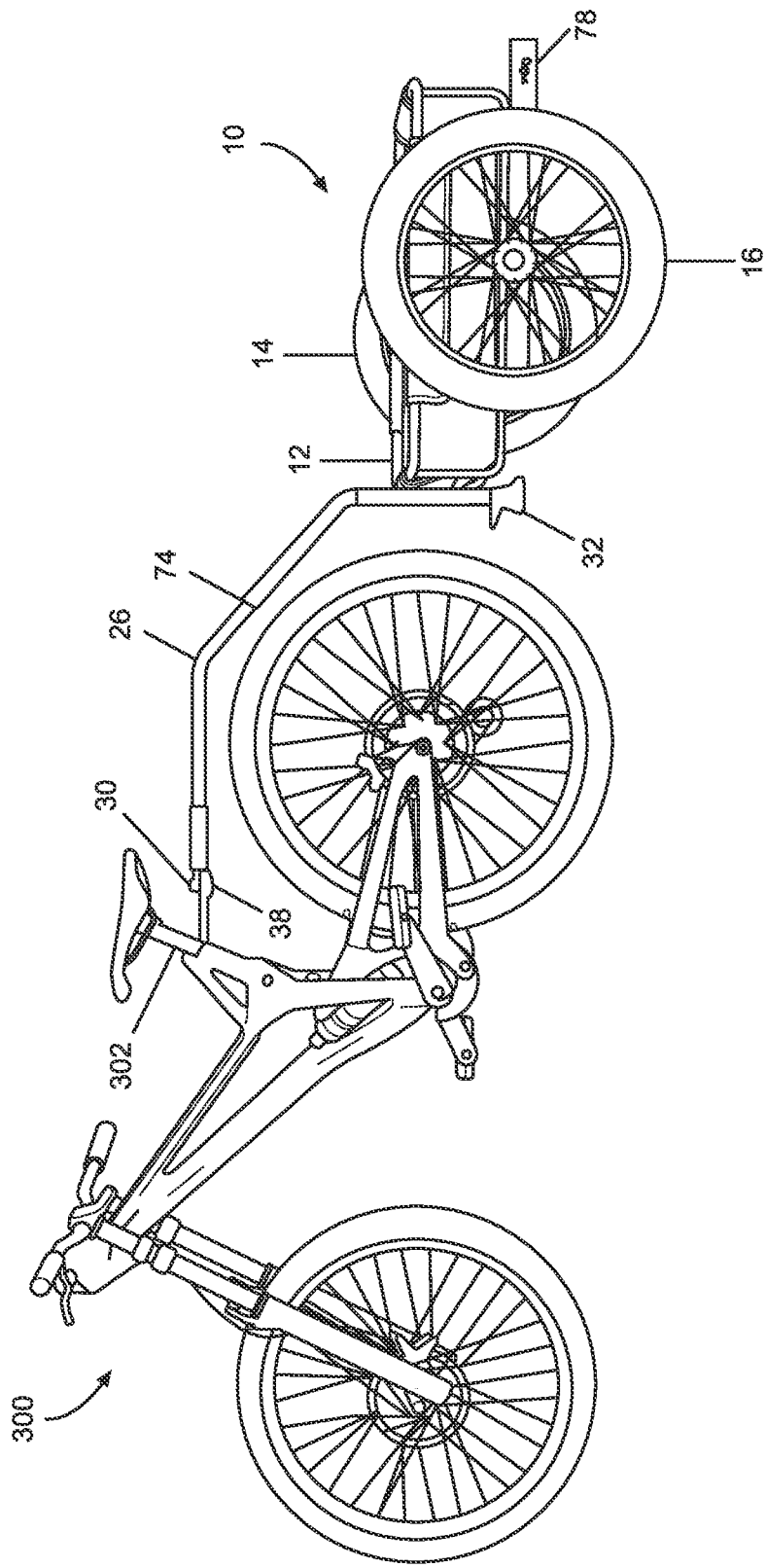
FIG. 14 is a view in side elevation of the convertible, all-terrain gear cart attached to a bicycle for towing.

An alternative trailer hitch connector combination 30 and 38 can be understood with additional reference to FIGS. 9A, 9B, and 14, for instance. There, the trailer hitch connector 30 retained at the distal end of the control arm 26 comprises a hemispherical member with a hemispherical cavity. The trailer hitch connector 38 fixed to the trailering vehicle 300, such as but not limited by clamping to the seat post 302 of a bicycle 300 as the trailering vehicle 300 again comprises a fixed retaining member 70. In this embodiment, the fixed retaining member 70 comprises a hemispherical retaining member 70 sized and shaped to be matingly received into the hemispherical cavity of the trailer hitch connector 30. A locking arm 72 again can be disposed, whether by pivoting into and out of position, by resiliency, or otherwise, to overlie the hemispherical member of the trailer hitch connector 30 as it is disposed atop the hemispherical retaining member 70 of the trailer hitch connector 38 to establish a trailering relationship between the trailering vehicle 300 and the all-terrain gear cart 10. The trailering coupling can be readily disengaged by retracting or otherwise adjusting the locking arm 72 and removing the hemispherical member of the trailer hitch connector 30 from the hemispherical retaining member 70 of the trailer hitch connector 38.

Figure 6:
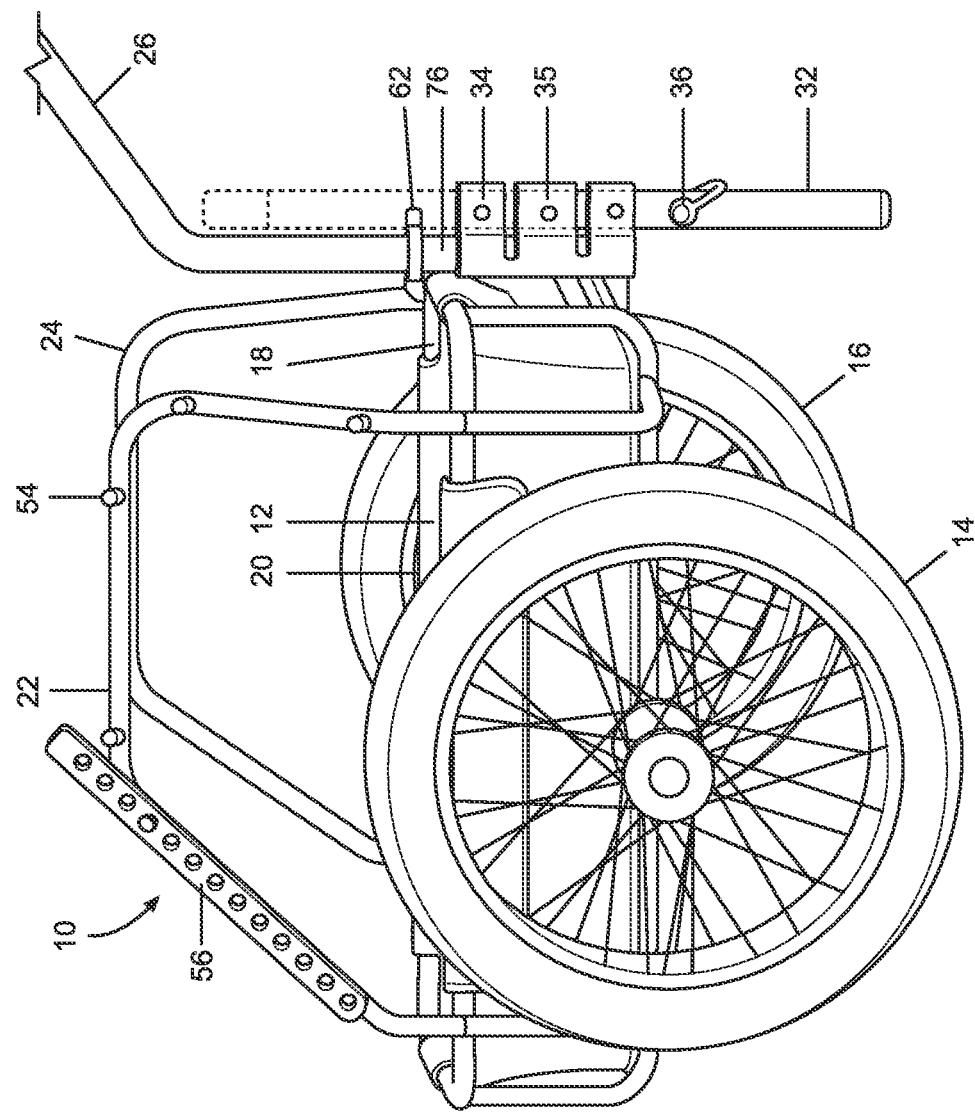
FIG. 6 is another perspective view of the convertible, all-terrain gear cart of FIG. 1.

With particular reference to FIG. 6, the gear cart 10 has a support leg 32. In certain embodiments, the support leg 32 can be fixed in position in which case the leg 32 may be of an abbreviated length. In the present embodiment, however, the support leg 32 can be adjusted from a support position extending downwardly from the cargo bin 12 to a retracted position. In the depicted manifestation, the support leg 32 is pivotably supported in relation to the cargo bin 12 by a support bracket 35. The support leg 32 can be retained in the support position or the retracted position by, for instance, a snap-fit engagement with upper and lower receiving latch portions 34 of the bracket 35. Additionally or alternatively, the support leg 32 can be retained in the support position or the retracted position by a locking pin 36 received by the support leg 32 and the bracket 35.

So constructed, the support leg 32 can be selectively adjusted to the support position to establish three points of support and stabilization for the gear cart 10, such as when the cart 10 is neither coupled for trailering relative to a bicycle 300 nor coupled for support and transport by a motor vehicle 200. When the support of the leg 32 is no longer required, such as when the gear cart 10 is to be manually propelled, trailered, or supported by a motor vehicle, the support leg 32 can be adjusted to the retracted position and secured there by the receiving latch 34 and, potentially, the locking pin 36.

Figure 2:
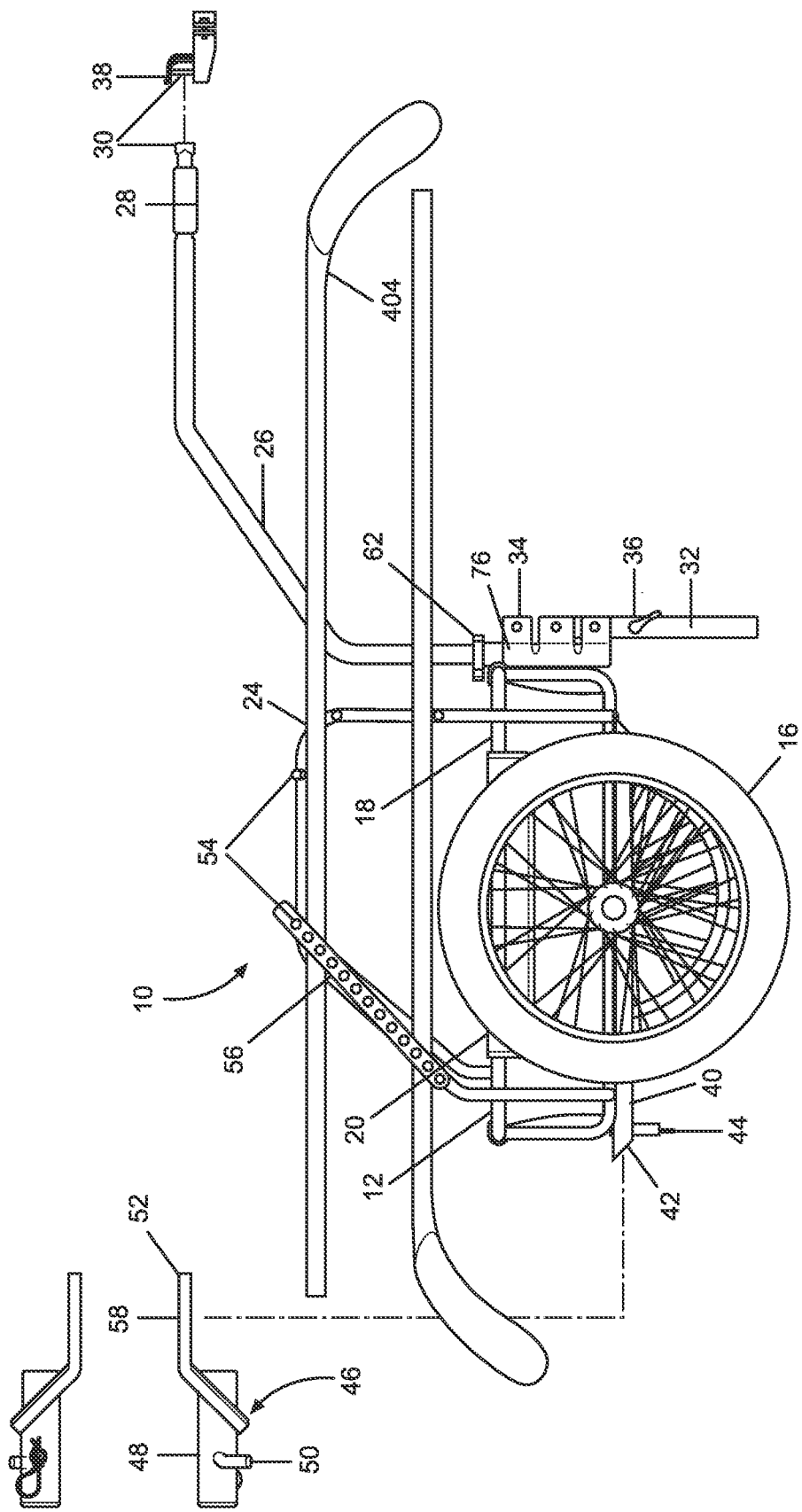
FIG. 2 is a view in side elevation of the convertible, all-terrain gear cart of FIG. 1.

Turning more particularly to FIGS. 2 and 3, the slot receiver 40 and its engagement with a trailer hitch adapter 46 according to the invention can be more fully understood. As set forth above, the slot receiver 40 is disposed to project longitudinally from below the second end of the cargo bin 12. There, the slot receiver 40 comprises a rigid sleeve, such as but not limited to a sleeve of metal, fixed to the lower portion of the cargo cage 18. The slot receiver 40 traverses from its distal end projecting beyond the second end of the cargo bin 12 to its proximal end adjacent to the first end of the cargo bin 12. The distal end of the slot receiver 40 is mitered to have a recessed lower portion and an overhanging upper portion that projects distally beyond the recessed lower portion. The overhanging upper portion of the distal end of the slot receiver 40 thus comprises a distally projecting shelf 42. Apart from its mitered distal end, the slot receiver 40 has a rectangular cross section that has a greater width dimension than its height dimension. With that, the portion of the slot receiver 40 proximal to the mitered distal end comprises a narrow slot opening. The slot receiver 40 has an aperture 64 that extends vertically therethrough adjacent to but spaced from the distal end of the slot receiver 40, and a locking pin 44 can be selectively disposed through the aperture 64.

With additional reference to FIGS. 3, 11A, 11B, and 11C, for example, a trailer hitch adapter 46 is particularly designed to establish a reliable, stable supporting engagement between a trailer hitch receiver 202 of a motor vehicle 200 and the slot receiver 40 of the gear cart 10. The trailer hitch adapter 46 has a rectangular bar portion 48 for being received into the trailer hitch receiver 202 of the motor vehicle 200. A pin 50 can be selectively passed through the trailer hitch receiver 202 and the bar portion 48 received therein to lock the trailer hitch adapter 46 in place.

As shown in FIG. 3, the bar portion 48 of the trailer hitch adapter 46 has a longitudinal centerline, and a rigid tongue 52 fixedly projects from the bar portion 48 in parallel to but offset from the longitudinal centerline by a distance D. As such, the trailer hitch adapter 46 can be inserted into a trailer hitch receiver 202 with the rigid tongue 52 disposed below the longitudinal centerline of the bar portion 48 or with the rigid tongue 52 disposed above the longitudinal centerline to adjust the effective height of the rigid tongue 52 by twice the distance D.

The rigid tongue 52 is sized and shaped to be closely received into the slot receiver 40. The tongue 52 has an aperture 58 therethrough to permit the gear cart 10 and the trailer hitch adapter 46 to be locked together by passage of the pin 44 through the apertures 58 and 64 in the trailer hitch adapter 46 and the slot receiver 40.

So constructed, the convertible, all-terrain gear cart 10 can be readily converted between modes of manual propulsion, trailering, and support by a motor vehicle. With the cargo cage 18 and first and second cargo retention and roll bars 22 and 24 supported by all-terrain wheels 14 and 16, the gear cart 10 can readily traverse varied terrain whether propelled manually as by gripping the control arm 26 or by being trailered behind a bicycle or other trailering vehicle 300. The gear cart 10 can do so while stably supporting and retaining widely varied cargo in a protective cage structure. Moreover, as is described further hereinbelow, by the interaction of the slot receiver 40 and the tongue 52 of the trailer hitch adapter 46, the gear cart 10 can be stably and reliably pivoted into and out of supported engagement with a trailer hitch receiver 202 of a motor vehicle 200 with minimized risk of inadvertent disengagement. Where necessary, such as when the convertible gear cart 10 is in manual propulsion mode not coupled to a trailering vehicle 300 and not supported by a motor vehicle 200, the support leg 32 can be readily employed to establish three points of support for the gear cart 10 to retain and support articles in an elevated, stabilized manner.

Figure 10:
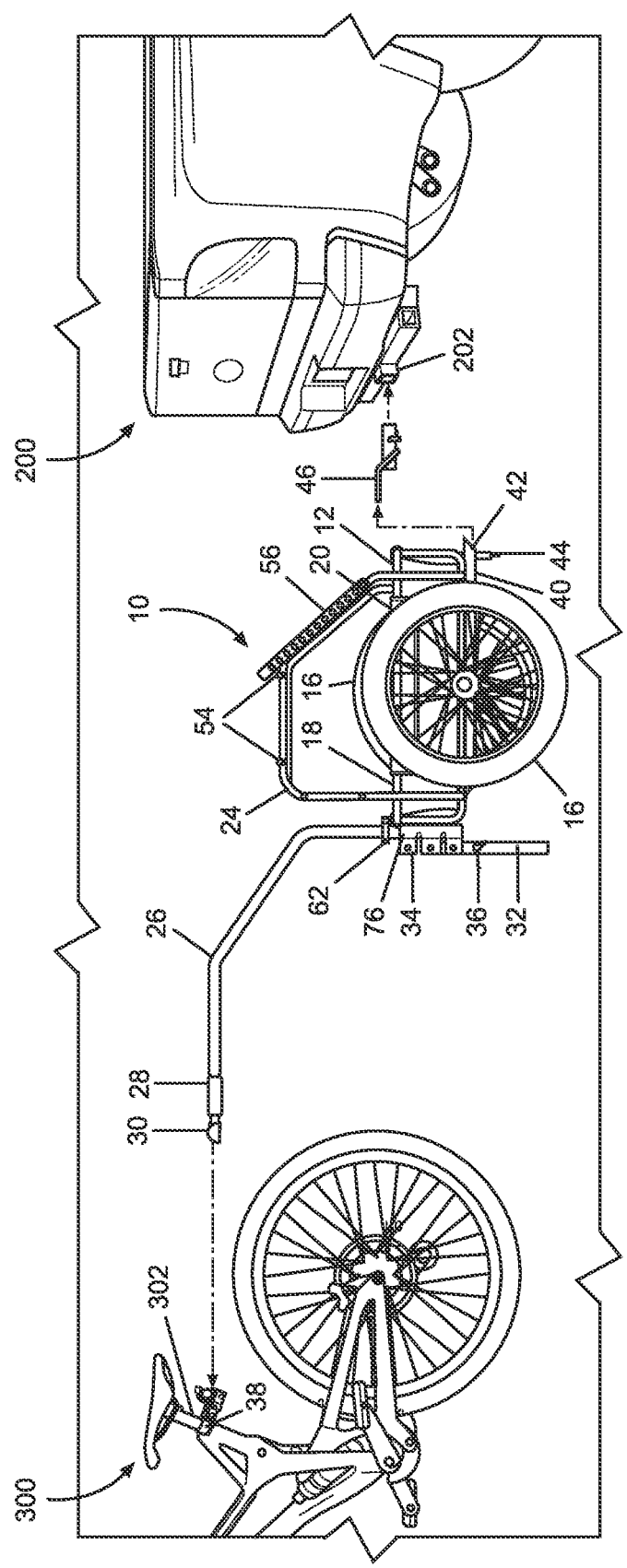
FIG. 10 is a perspective view of the convertible, all-terrain gear cart depicting options for bicycle trailering, manual propulsion, and vehicle mounting.

With further reference to FIG. 10, the multi-functionality of the convertible, all-terrain gear cart 10 can be further appreciated. As suggested therein, a user can readily grip the handle 28 of the control arm 26 to push or pull the gear cart 10 by hand. The gear cart 10 and any gear supported thereby can be manipulated over a wide variety of terrain surfaces in a stable and secure manner. When trailering behind a bicycle 300 or other trailering vehicle 300 is desired, the trailer hitch connector 30 at the distal end of the control arm 26 can be engaged and retained by the trailer hitch connector 38 fixed to the bicycle 300. When it is desired to transport the gear cart 10 and, potentially, cargo retained by the gear cart 10 by motor vehicle 200, such as might be desirable over longer distances, the gear cart 10 can be engaged with and supported by the vehicle 200 by reception of the tongue of the trailer hitch adapter 46 into the slot receiver 40 of the cargo bin 12.

Figure 11:
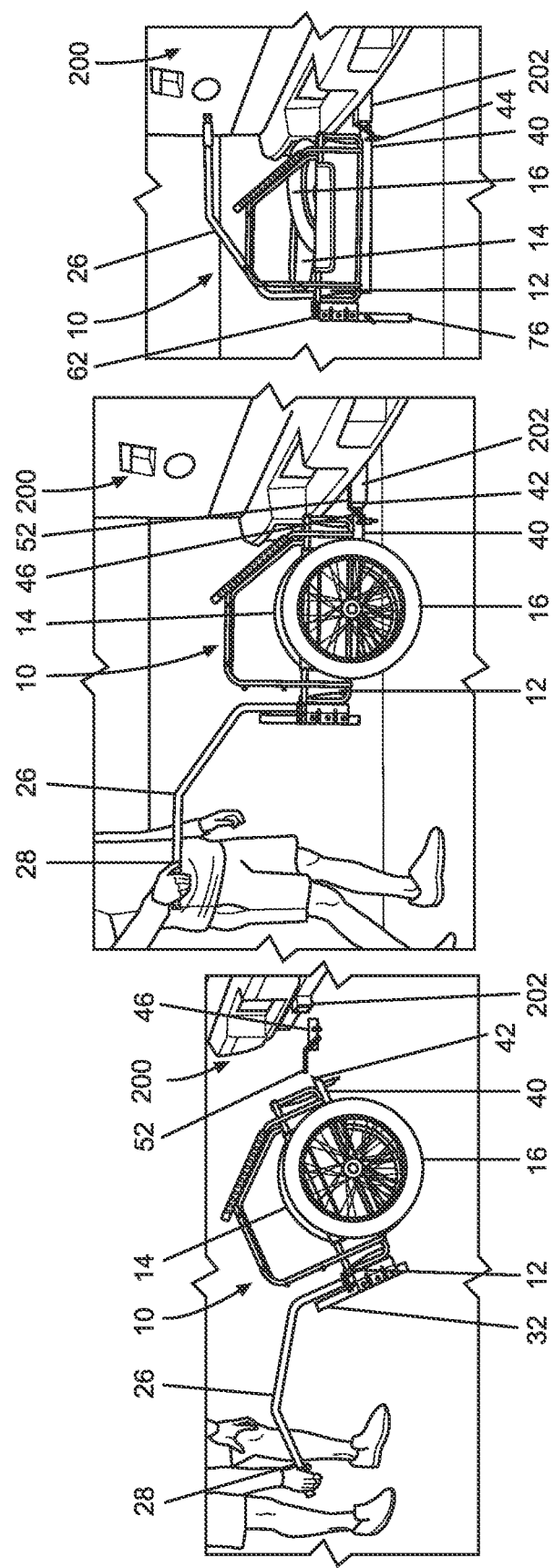
FIGS. 11A, 11B, and 11C are progressive views of the engagement of the convertible, all-terrain gear cart with a motor vehicle.

Possible steps in converting the all-terrain gear cart 10 from use as a manually-propelled unit to being supported by a motor vehicle 200 can be more fully understood with reference to FIGS. 11A, 11B, and 11C. In FIG. 11A, the gear cart 10 is configured for manual propulsion with the control arm 26 pivoted to a use orientation extending longitudinally from the cargo bin 12. A trailer hitch adapter 46 is locked in place with the bar portion 48 thereof locked within the trailer hitch receiver 202 of the motor vehicle 200. With the control arm 26 in the use orientation and with the all-terrain wheels 14 and 16 coaxially disposed at a mid-portion of the cargo bin 12, the control arm 26 can be pressed downwardly and thereby employed to pivot the cargo bin 12 about the wheels 14 and 16 to cause the first end of the cargo bin 12 to move downwardly while the second end of the cargo bin 12 and the distal end of the slot receiver 40 retained thereby pivot upwardly. With the gear cart 10 so pivoted, the distally projecting shelf 42 of the mitered end of the slot receiver 40 can be stably rested atop the rigid tongue 52 of the trailer hitch adapter 46. Both the slot receiver 40 and the rigid tongue 52 are appreciably wider than they are thick or tall. The rigid tongue 52 could also be described as a rigid plate 52. The tongue 52 has flat upper and lower faces, which change as to which is upper and which is lower depending on the orientation of the trailer hitch adapter 46, and the rectangular nature of the slot receiver 40 forms the distally projecting shelf 42 likewise to be flat. So formed, the tongue 52 presents a flat stabilizing surface on which the flat distally projecting shelf 42 of the slot receiver 40 can rest so that a stable relationship is established that resists inadvertent disengagement or flipping of the gear cart 10 relative to the trailer hitch adapter 46.

With the distally projecting shelf 42 and the rigid tongue 52 so engaged, the mechanical advantage of the longitudinally extending control arm 26 can be exploited as a lever as in FIG. 11B to pivot the gear cart 10 upwardly by lifting the control arm 26 by the handle 28 and using the rigid tongue 52 as a fulcrum. The user need not directly lift the entire weight of the gear cart 10 and any gear retained thereby. The gear cart 10 can be pivoted until the slot receiver 40 is in longitudinal alignment with the rigid tongue 52. However, it will be noted that even excess pivoting beyond that longitudinal alignment will not tend to disengage the distally projecting shelf 42 from the rigid tongue 52. This is a marked differentiation from prior art structures using square engaging members to engage square receivers so that excess pivoting could well inadvertently disengage the engaging member from the receiver resulting in risks to the vehicle, the user, and any retained gear.

With the slot receiver 40 aligned with the rigid tongue 52, the gear cart 10 can be slid toward the vehicle to cause the tongue 52 to be received into the slot receiver 40 until the apertures 58 and 64 of the tongue 52 and the slot receiver 40 are aligned. Then, the pin 44 can be inserted through the apertures 58 and 64 to lock the tongue 52 within the slot receiver 40 and to lock the gear cart 10 in a position stably supported by the vehicle 200. With the gear cart 10 fixed in place, the control arm 26 can be pivoted 180 degrees and locked by the clamping mechanism 62 in the storage position of FIG. 11C. In the storage position, the central and distal segments of the control arm 26 overlie the cargo bin 12 of the gear cart 10. Where desired, the all-terrain wheels 14 and 16 can be readily removed, such as by pressing on release buttons or otherwise.

To similar advantage, the steps can be reversed to enable the gear cart 10 to be stably and reliably disengaged from the motor vehicle 200. For instance, the control arm 26 can be pivoted 180 degrees to the use position of FIG. 11B, and, if necessary, the wheels 14 and 16 can be reattached. The locking pin 44 can be removed, and the gear cart 10 can be slid away from the vehicle 200 until the distally extending shelf 42 overlies the distal end of the tongue 52. Again to some advantage, the risk of premature disengagement of the gear cart 10 from the vehicle 200 is minimized in that the user has the opportunity by virtue of the mitered nature of the end of the slot receiver 40 to perceive visually and mechanically the presence of the distal end of the tongue 52 as it overlaps the distally extending shelf 42 before the tongue 52 is entirely removed from the slot receiver 40. Then, the gear cart 10 can be pivoted downwardly, again using the rigid tongue 52 as a fulcrum, until the wheels 14 and 16 safely rest on the ground surface. The slot receiver 40 can then be fully disengaged from the tongue 52, and the gear cart 10 can be manually propelled by gripping the handle 28 of the control arm 26. Alternatively, the gear cart 10 can be attached for trailering relative to a bicycle or other trailering vehicle 300, or the gear cart 10 can simply be supported in a substantially upright position by deployment of the support leg 32.

Where a relatively lower disposition of the gear cart 10 in relation to the motor vehicle 200 is desired, the trailer hitch adapter 46 can be oriented with the rigid tongue 52 above the longitudinal centerline of the trailer hitch adapter 46. Conversely, where a relatively higher disposition of the gear cart 10 in relation to the motor vehicle 200 is sought, the trailer hitch adapter 46 can be oriented with the rigid tongue 52 below the longitudinal centerline of the trailer hitch adapter 46.

A further embodiment of the convertible, all-terrain gear cart 10 is depicted in FIGS. 12 through 16B. The gear cart 10 is again founded on a cargo bin 12. A control arm 26 with a handle 28 is pivotally coupled to the first end of the cargo bin 12 to pivot about a vertical axis of rotation. In the present embodiment, as best perceived perhaps in FIGS. 16A and 16B, an extendable and retractable retaining post 78, which is rectangular in cross section, is fixed to the lower surface of the cargo bin 12. The control arm 26 and the retaining post 78 are disposed in alignment with a longitudinal centerline of the cargo bin 12 and the convertible, all-terrain gear cart 10 in general. A retractable support leg 32, which in this embodiment slides longitudinally between extended and retracted positions, is coupled to the first end of the cargo bin 12 in general alignment with the longitudinal centerline of the cargo bin 12. First and second all-terrain wheels 14 and 16 are rotatably retained at a mid-portion of the cargo bin 12 to have aligned, lateral axes of rotation that are orthogonal to the longitudinal centerline of the gear cart 10. The all-terrain wheels 14 and 16 are again detachable.

A cargo cage 18 of the cargo bin 12 defines an inner cargo storage volume that is rectangular in lateral cross section with a length, a width, and a depth. The cargo cage 18 again has an upper rectangular frame portion, a lower rectangular frame portion, first and second spaced apart U-shaped longitudinal frame portions, and first and second spaced apart U-shaped lateral frame portions that are fixed together to form the cargo cage 18. The tip segments of the upturned first and second legs of each longitudinal frame portion are fixed to laterally communicating segments of the upper rectangular frame portion, and the tip segments of the upturned first and second legs of each lateral frame portion are fixed to longitudinally communicating segments of the upper rectangular frame portion.

A cargo liner 20 is again received and retained by the cargo cage 18. The cargo liner 20 substantially corresponds in shape and size to that of the interior space bounded by the cargo cage 18 with flap portions overlying the lateral and longitudinal segments of the upper frame portion of the cargo cage 18 and a bottom of the cargo liner 20 supported by the lower rectangular frame portion and the central segments of the U-shaped lateral and longitudinal frame portions of the cargo cage 18. As before, the cargo liner 20 can be of any suitable material or materials, and the cargo that can be retained and transported by use of the gear cart 10 is unlimited as to type.

The control arm 26 has a proximal segment pivotally retained relative to the cargo bin 12 by a control arm receiver tube 76 fixed to the first end of the cargo bin 12. A central segment of the control arm 26 is disposed at a non-zero angle relative to the proximal segment, and a distal segment of the control arm 26 is disposed at a non-zero angle relative to the central segment and at a 90-degree angle relative to the proximal segment. The distal segment of the control arm 26 comprises a handle portion 28 and a trailer hitch connector 30, which in this non-limiting example comprises a hemispherical member with a hemispherical cavity with it again being noted that other trailer hitch connectors 30 can be employed within the scope of the invention.

The control arm 26 is pivotable and can be adjustable in height in relation to the control arm receiver tube 76 and thus in relation to the cargo bin 12. Moreover, a length adjustment connection 74 can be provided along the control arm 26, such as in the central segment of the control arm 26 as in the depicted embodiment, to permit an adjustment of the distance between the trailer hitch connector 30 and the cargo bin 12 and also to permit an adjustment of the height of the distal segment of the control arm 26 and the trailer hitch connector 30. The control arm 26 again can be selectively locked against pivoting and, additionally or alternatively, against height adjustment and conversely permitted to pivot and adjust in height by one or more clamping mechanisms or locking pins, ball and spring detents, or any other effective mechanism. The control arm 26 can thus be pivoted 180 degrees from the use position of, for example, FIGS. 12 and 13 to the storage position of, for instance, FIG. 15C. Moreover, the control arm 26 is detachable from the receiver tube 76 and the cargo bin 12, including to permit storage or transport of the all-terrain gear cart 10.

Looking further to FIGS. 16A and 16B, the retaining post 78 and its engagement with a trailer hitch receiver 202 of a motor vehicle 200 can be further understood. The retaining post 78 has a retracted position as in FIG. 16A and an extended position as in FIG. 16B where the distal portion of the retaining post 78 projects substantially beyond the second end of the cargo bin 12. The retaining post 78 comprises a first rigid sleeve 84 extendably and retractably coupled with a second rigid sleeve 86. The sleeves 84 and 86 can be of metal or any other suitable material, and the sleeves 84 and 86 can have rectangular cross sections with the first sleeve 84 sized and shaped in cross section to match the size and shape of the trailer hitch receiver 202. A locking pin 80 can be selectively received through aligned apertures in the first sleeve 84 and the trailer hitch receiver 202 thereby to lock the retaining post 78 in place within the trailer hitch receiver 202.

Figure 12:
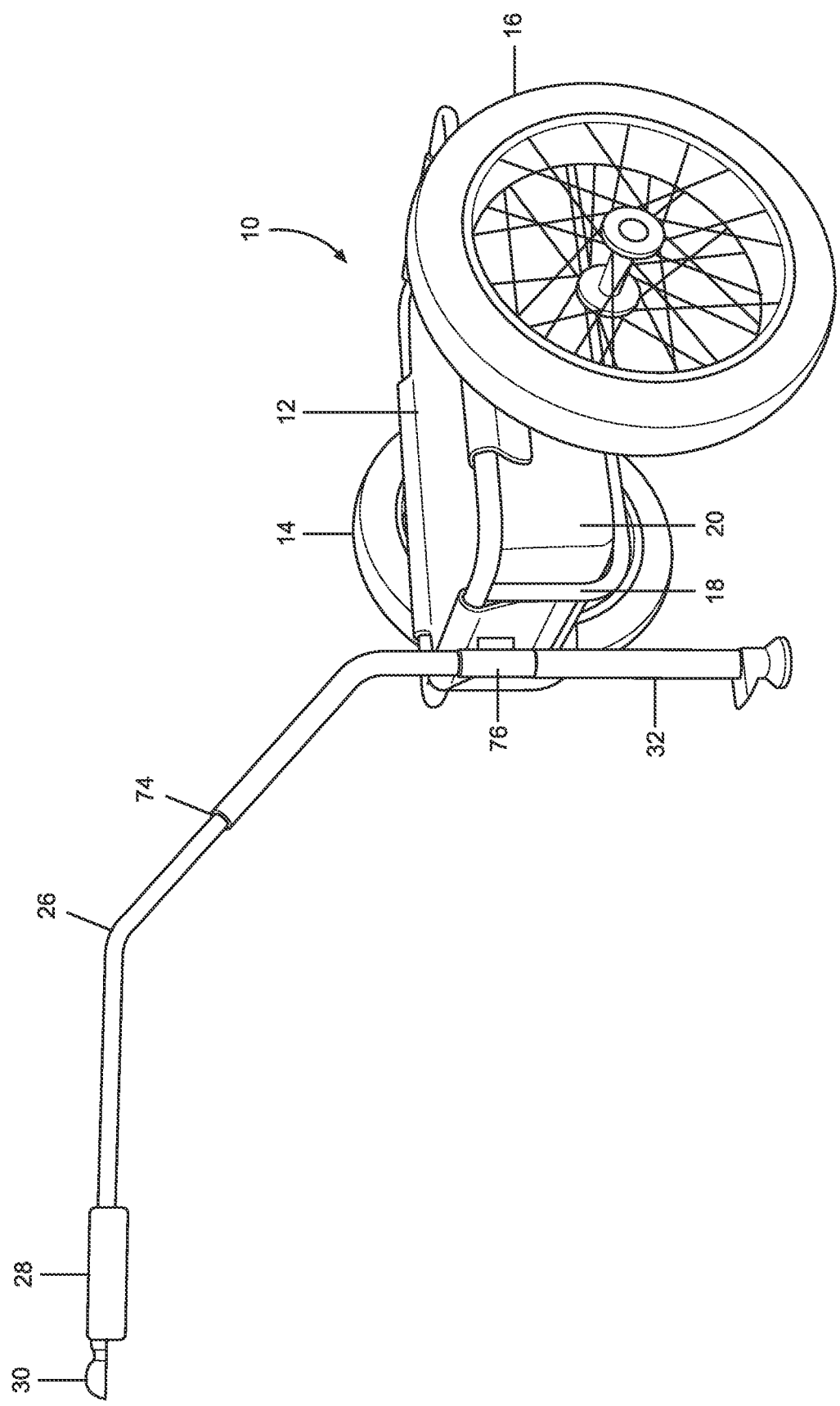
FIG. 12 is a perspective view of an alternative embodiment of the convertible, all-terrain gear cart.
Figure 13:
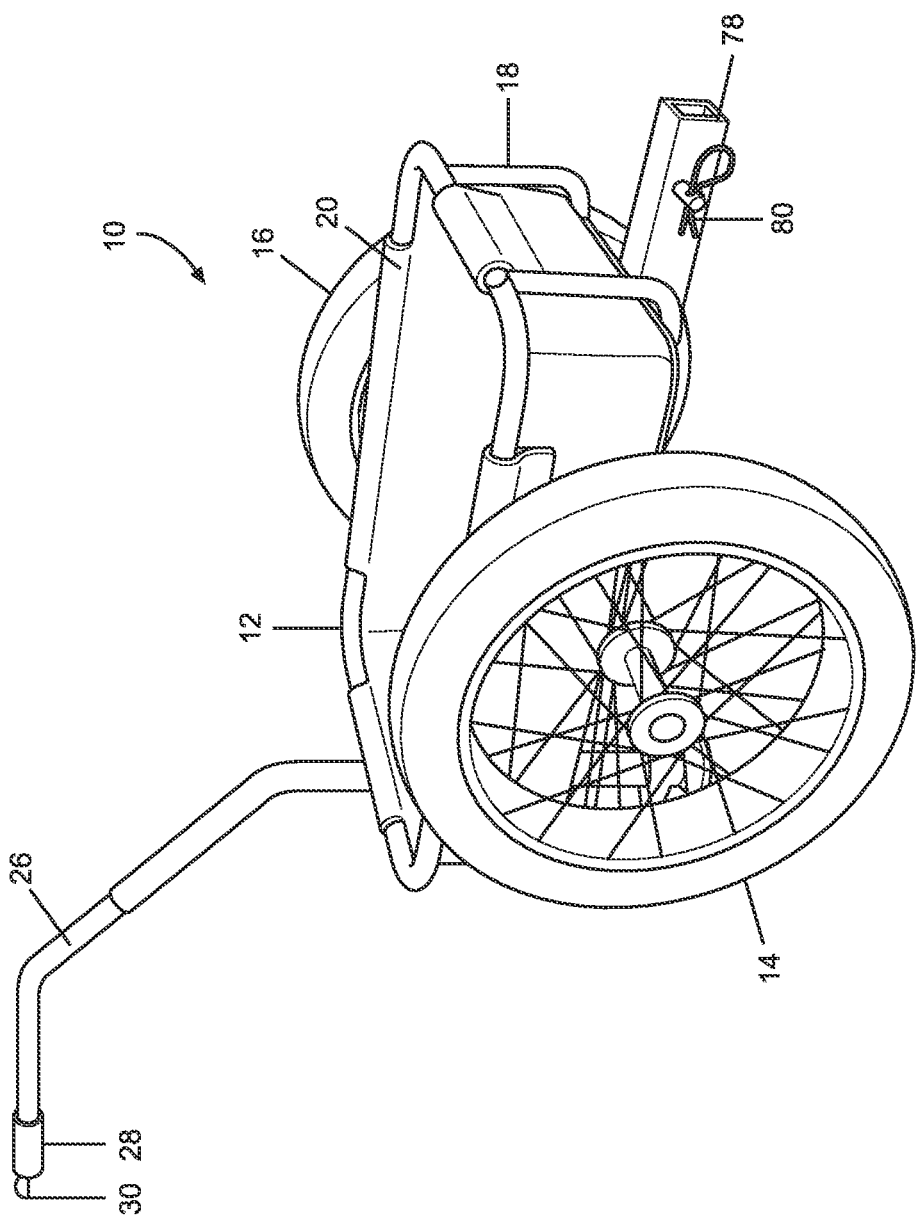
FIG. 13 is a further perspective view of the convertible, all-terrain gear cart of FIG. 12.

In certain embodiments, as FIGS. 12 and 13 show, the retaining post 78 can terminate in a squared end portion. Alternatively, as FIGS. 16A and 16B illustrate, the distal end of the first sleeve 84 of the retaining post 78 can be mitered. For instance, the distal end of the first sleeve 84 of the retaining post 78 can be mitered to have the lower portion of the first sleeve 84 extend distally beyond the upper portion of the first sleeve 84 of the retaining post 78. In such embodiments, the distally projecting lower portion of the first sleeve 84 of the retaining post effectively forms a shelf 82. The retaining post 78 traverses from the distal end of the first sleeve 84, which can be extended to project beyond the second end of the cargo bin 12, to a proximal end of the second sleeve 86 adjacent to the first end of the cargo bin 12. The first sleeve 84 of the retaining post 78 has an aperture that extends horizontally therethrough adjacent to but spaced from the distal end of the first sleeve 84, and a locking pin 80 can be selectively disposed through the apertures in the first sleeve 84 and the trailer hitch receiver 202 of the vehicle 200 to lock the retaining post 78 and the gear cart 10 in general in place relative to the vehicle 200.

With the convertible, all-terrain gear cart 10 so constructed, the gear cart 10 can be readily converted between modes of manual propulsion, trailering, and support by a motor vehicle. For instance, the gear cart 10 can be pushed or pulled by hand over widely varied terrain by gripping the handle 28 of the control arm 26. Trailering behind a bicycle 300 or other trailering vehicle 300 can be accomplished by engaging the trailer hitch connector 30 at the distal end of the control arm 26 with the trailer hitch connector 38 fixed to the bicycle 300. Alternatively, the gear cart 10 and any retained cargo can be transported by motor vehicle 200 by reception of the distal end of the first sleeve of the retaining post 78 into the trailer hitch receiver 202 of the motor vehicle 200.

Figure 15C:
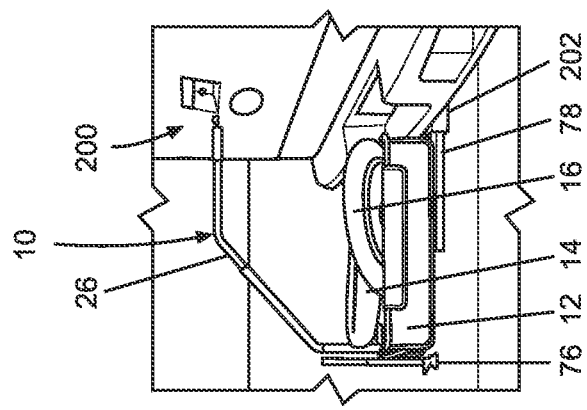
FIGS. 15A, 15B, and 15C are progressive perspective views of the engagement of the convertible, all-terrain gear cart of FIG. 12 with a motor vehicle.
Figure 15B:
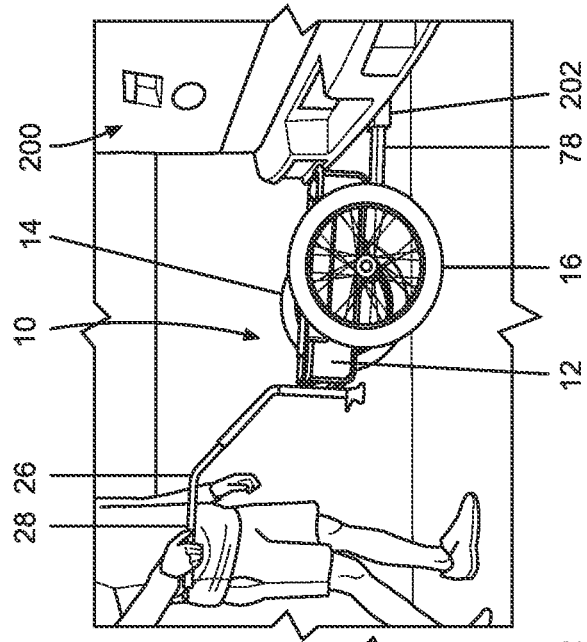
Figure 15A:
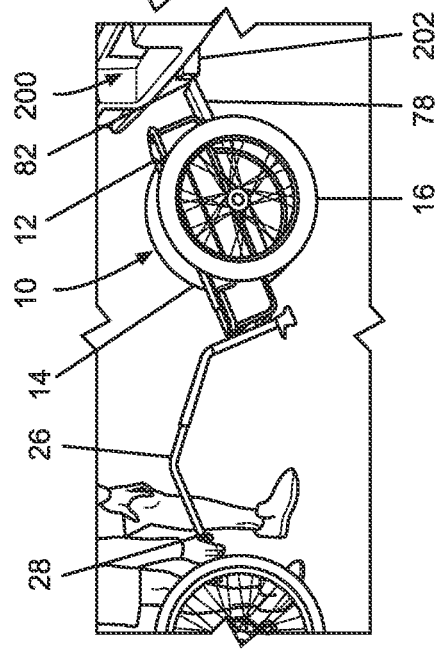

The all-terrain gear cart 10 can be converted from its manual propulsion mode as in FIG. 15A to being supported by a motor vehicle 200 with a trailer hitch receiver 202 as shown in FIG. 15C. In the manual propulsion mode of FIG. 15A, the control arm 26 is disposed in a use orientation extending longitudinally from the cargo bin 12. With the control arm 26 in the use orientation and with the all-terrain wheels 14 and 16 coaxially disposed at a mid-portion of the cargo bin 12, the control arm 26 and the cargo bin 12 can be caused to pivot about the wheels 14 and 16 by pushing the control arm 26 downwardly, which causes the first end of the cargo bin 12 to move downwardly while the second end of the cargo bin 12 and the distal end of the retaining post 78 pivot upwardly. The distally projecting shelf 82 of the mitered end of the retaining post 78, or the square end of the retaining post 78 where the post 78 is not mitered, can then be rested atop the lower portion of the trailer hitch receiver 202 of the vehicle 200. With the retaining post 78 so disposed, the mechanical advantage of the extending control arm 26 can be exploited as in FIG. 15B to lever the gear cart 10 upwardly by lifting the control arm 26 by the handle 28 and using the trailer hitch receiver 202 as a fulcrum. The gear cart 10 can be pivoted until the retaining post 78 is in longitudinal alignment with the trailer hitch receiver 202. Particularly where the end of the retaining post 78 is mitered, even excess pivoting beyond that longitudinal alignment will not tend to disengage the distally projecting shelf 82 from the trailer hitch receiver 202.

With the retaining post 78 aligned with the trailer hitch receiver 202, the gear cart 10 can be slid toward the vehicle to cause the retaining post 78 to be received into the trailer hitch receiver 202 until the apertures of the retaining post 78 and the trailer hitch receiver 202 are aligned. Then, the pin 80 can be inserted through the apertures to lock the retaining post 78 and the gear cart 10 in a position stably supported by the vehicle 200. With the gear cart 10 thus fixed in place, the control arm 26 can be pivoted 180 degrees and potentially locked in the storage position of FIG. 15C where the central and distal segments of the control arm 26 overlie the cargo bin 12 of the gear cart 10. The all-terrain wheels 14 and 16 can be readily removed from the cargo bin 12 where desirable, such as by pressing on release buttons or otherwise.

The gear cart 10 can be disengaged from the motor vehicle 200 by reversing the foregoing steps. More particularly, the control arm 26 can be pivoted 180 degrees to the use position of FIG. 15B, and the wheels 14 and 16 can be reattached, if necessary. With the locking pin 80 removed, the gear cart 10 can be slid away from the vehicle 200, such as until the distally extending shelf 82 overlies the distal end of the trailer hitch receiver 202 where the retaining post 78 has a mitered end portion such that the user has the opportunity to perceive the presence of the distal end of the first sleeve of the retaining post 78 before it is entirely removed from the trailer hitch receiver 202. The gear cart 10 can then be pivoted downwardly, again using the trailer hitch receiver 202 as a fulcrum, until the wheels 14 and 16 safely rest on the ground surface. The retaining post 78 can then be fully disengaged from the trailer hitch receiver 202, and the gear cart 10 can be manually propelled by gripping the handle 28 of the control arm 26 or attached for trailering relative to a bicycle or other trailering vehicle 300. Alternatively, the gear cart 10 can simply be supported in a substantially upright position by adjusting the support leg 32 to its extended position.

Figure 17:
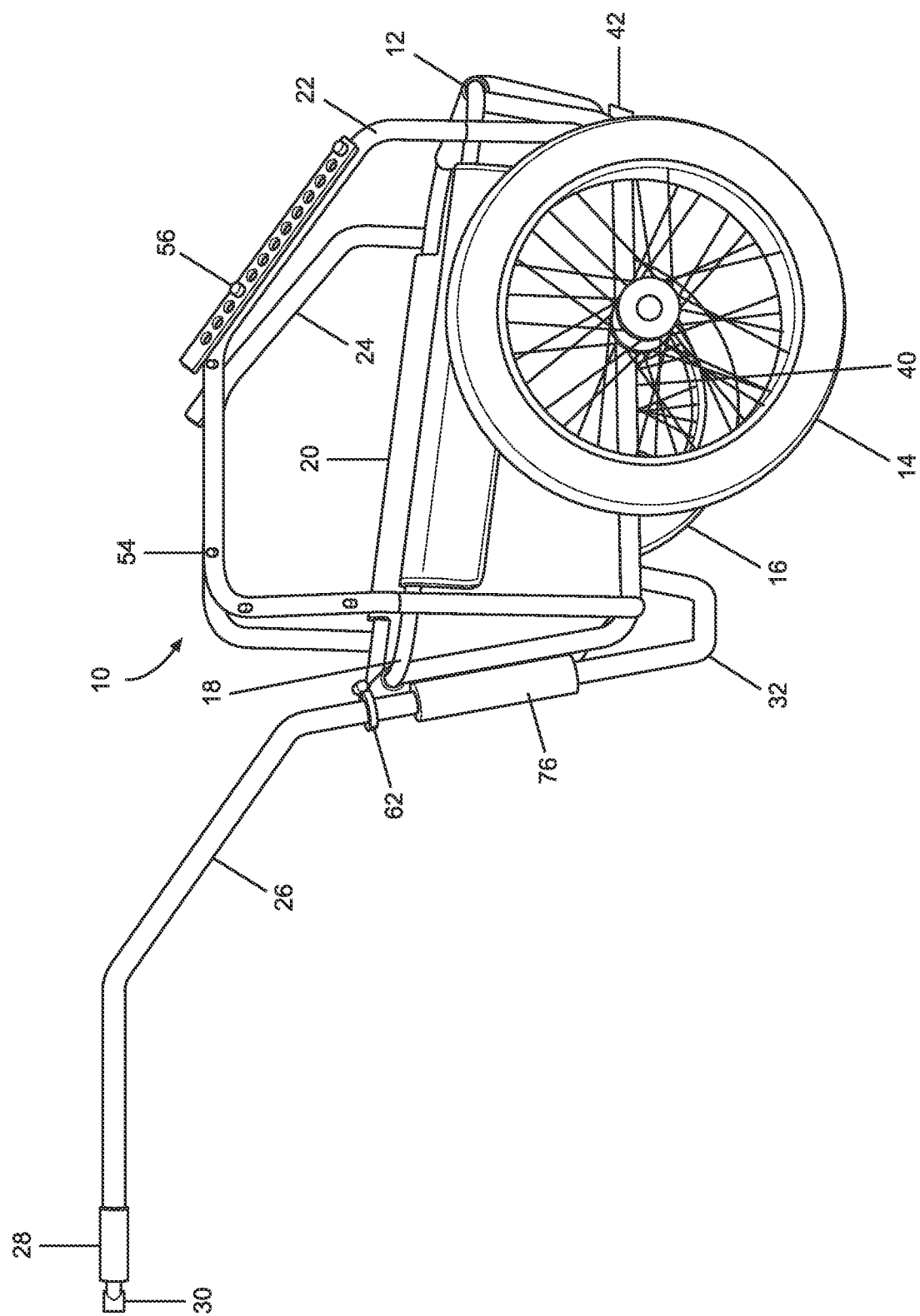
FIG. 17 is a perspective view of a further embodiment of the convertible, all-terrain gear cart of the present invention.

A further embodiment of the convertible, all-terrain gear cart according to the present invention is again indicated generally at 10 in FIGS. 17 and 18. The gear cart 10 is again founded on a cargo bin 12 with a first end, a second end, a first side, and a second side. An inner cargo storage volume of the cargo bin 12 is defined by a cargo cage 18. The inner cargo storage volume is rectangular in lateral cross section to have a length, a width, and a depth, and the cargo cage 18 again has an upper rectangular frame portion, a lower rectangular frame portion, first and second spaced apart U-shaped longitudinal frame portions, and first and second spaced apart U-shaped lateral frame portions with each of the frame portions again formed by one or more segments of rigid tubing, such as metal tubing. The frame portions are fixed together, such as by welding, by mechanical fasteners, by integral formation, or by any other effective method or combination thereof, to form the cargo cage 18. The tip segments of the upturned first and second legs of each longitudinal frame portion are again fixed to laterally communicating segments of the upper rectangular frame portion while the tip segments of the upturned first and second legs of each lateral frame portion are exposed and open and are fixed laterally outboard of longitudinally communicating segments of the upper rectangular frame portion.

As in earlier-shown embodiments, a cargo liner 20 is received and retained by the cargo cage 18 with the cargo liner 20 substantially corresponding to the shape and size of the interior space bounded by the cargo cage 18. Flap portions of the cargo liner 20 overlie the lateral and longitudinal segments of the upper frame portion of the cargo cage 18, and a bottom of the cargo liner 20 is supported by the lower rectangular frame portion and the central segments of the U-shaped lateral and longitudinal frame portions of the cargo cage 18.

A control arm 26 with a handle 28 is again pivotally coupled to the first end of the cargo bin 12 by a control arm receiver tube 76, and a slot receiver 40 is disposed to project from below the second end of the cargo bin 12. Both the control arm 26 and the receiver 40 are disposed in alignment with a longitudinal centerline of the cargo bin 12 and the convertible, all-terrain gear cart 10 in general. First and second accessory attachment and retention structures, which in this embodiment again comprise cargo retention and roll bars 22 and 24 but could well comprise other accessory attachment and retention structures, project upwardly from the first and second sides of the cargo bin 12. The gear cart 10 is supported for manual propulsion or trailering by detachable first and second all-terrain wheels 14 and 16 that are rotatably retained at a mid-portion of the cargo bin 12 with aligned, lateral axes of rotation orthogonal to the longitudinal centerline of the gear cart 10. In the present embodiment, a fixed support leg 32 is formed by a U-shaped reverse bent lower portion of the control arm receiver tube 76. The support leg 32 is calibrated to be tall enough to cooperate with the wheels 14 and 16 to provide three-point support to the gear cart 10 when needed but short enough to permit the gear cart 10 to be trailered and maneuvered manually without obstruction.

In the present embodiment, the cargo bin 12 and the cargo cage 18 defining it have an upper periphery that extends beyond the peripheries of the all-terrain wheels 14 and 16. With that, gear can be disposed on top of or extending beyond the sides of the cargo bin 12 without being impacted by the wheels 14 and 16. The cargo bin 12 thus further enables the transport of, by way of example and not limitation, flat and bulky articles resting atop or otherwise overlying the edges of the cargo bin 12. Also as shown in this embodiment, the cargo cage 18 and the cargo bin 12 can have a tapered height so that the cargo bin 12 and the cargo cage 18 pursue a truncated wedge shape here with the taller end of the wedge shape being adjacent to the control arm 26 and the shorter end of the wedge shape being adjacent to the second end of the cargo bin 12. Still further, the cargo cage 18 and the cargo bin 12 have outwardly angled walls to the ends and sides thereof.

The first and second cargo retention and roll bars 22 and 24 or other accessory attachment and retention structures 22 and 24 are again removably and replaceably coupled to the cargo bin 12 with tip segments sized and spaced to be matingly engaged, whether to receive or to be received by the tip segments of the upturned first and second legs of the lateral frame portions of the cargo cage 18. The first and second legs of the roll bars 22 and 24 again have aligned lateral bends therein so that, when the roll bars 22 and 24 are engaged with the cargo cage 18, the roll bars 22 and 24 angle inwardly toward the longitudinal centerline of the gear cart 10. It will be understood that the cargo bin 12 could have other tip segments or structures for engaging and retaining the accessory attachment and retention structures 22 and 24. The tip segments of the cargo cage 18 lateral frame portions may be efficiently employed, but other structures would be readily within the scope of the invention except as the claims might expressly exclude. Retaining members 54 are spaced along the cargo retention and roll bars 22 and 24, and plural retaining straps 56 can thus engage the roll bars 22 and 24 and the cargo bin 12 in general to secure articles in relation to the gear cart 10.

The control arm 26 again has a proximal segment retained by the cargo bin 12, a central segment disposed at a non-zero angle relative to the proximal segment, and a distal segment disposed at a non-zero angle relative to the central segment. Here, however, with the first end wall of the cargo bin 12 angled outwardly at a given angle, the proximal segment of the cargo bin 12 is likewise pivotally retained at that same angle by the similarly-angled control arm receiver tube 76. The distal segment of the control arm 26 is crafted to be in a plane generally parallel to a plan of the bottom of the cargo bin 12 and at an angle greater than 90 degrees relative to the proximal segment of the control arm 26. With this, the distal segment pursues a horizontal disposition when the cargo bin 12 is in a position with the bottom of the cargo bin 12 in a horizontal disposition and vice versa. The distal segment of the control arm 26 again comprises a handle portion 28 and a trailer hitch connector 30, which can be of any effective type. The control arm 26 is pivotable and adjustable in height in relation to the control arm receiver tube 76 and in relation to the cargo bin 12 in general. The control arm 26 can be selectively locked against pivoting and, additionally or alternatively, height adjustment by a locking mechanism 62. The control arm 26 can thus again be pivoted 180 degrees from the use position illustrated to a storage position, and the control arm 26 can be selectively detached from the receiver tube 76 and the cargo bin 12.

In the present embodiment, the slot receiver 40, which again comprises a rigid sleeve, is disposed to be accessible from below the second end of the cargo bin 12. The slot receiver 40 may, but need not necessarily, extend beyond the second end of the cargo bin 12. The distal end of the slot receiver 40 is again mitered to have a recessed lower portion and an overhanging upper portion that projects distally beyond the recessed lower portion to form a distally projecting shelf 42. Apart from that distal end, the slot receiver 40 has a cross section that has a greater width dimension than its height dimension. By way of non-limiting example, that cross section could be generally rectangular, or it could be oblong or another shape. The portion of the slot receiver 40 proximal to the mitered distal end can again form a narrow slot opening, and an aperture 64 extends vertically therethrough adjacent to but spaced from the distal end of the slot receiver 40 so that a locking pin (not shown in this embodiment) can be selectively disposed through the aperture 64. The slot receiver 40 so constructed can again cooperate with a trailer hitch adapter 46 as in FIG. 3 to establish a reliable, stable supporting engagement between the gear cart 10 and a trailer hitch receiver 202 of a motor vehicle 200. The convertible, all-terrain gear cart 10 can thus be readily converted between modes of manual propulsion, trailering, and support by a motor vehicle.

It will be understood that any terms of orientation used herein merely provide a complete understanding of the disclosed convertible, all-terrain gear cart 10 and are not limiting of the invention. Other nomenclature and conventions may be used without limitation of the teachings herein. Furthermore, the various components disclosed herein are merely illustrative and are not limiting. For example, except as limited by the claims, each of the components discussed herein may include subcomponents that collectively provide for the structure and function of the disclosed component. Furthermore, one or more components, sometimes referred to as members or otherwise herein, could be combined as a unitary structure while still corresponding to the disclosed invention. Additional components that provide additional functions or enhancements to those introduced herein may be included. For example, additional components or materials, combinations of components or materials, and perhaps the omission of components or materials may be used to create embodiments that are nonetheless within the scope of the invention.

When referencing or introducing elements of the present invention or embodiments thereof, the articles "a," "an," and "the" are intended to mean that there are one or more of the elements. Terms such as "comprising," "including," and "having" are intended to be inclusive such that there may be additional elements other than the listed elements. As used herein, the terms "example" and "exemplary" are not intended to imply a superlative example. Rather, such terms refer to an embodiment that is one of many possible embodiments.

With certain details and embodiments of the present invention for a convertible, all-terrain gear cart 10 disclosed, it will be appreciated by one skilled in the art that numerous changes and additions could be made thereto without deviating from the spirit or scope of the invention. This is particularly true when one bears in mind that the presently preferred embodiments merely exemplify the broader invention revealed herein. Accordingly, it will be clear that those with major features of the invention in mind could craft embodiments that incorporate those major features while not incorporating all of the features included in the preferred embodiments.

Therefore, the following claims shall define the scope of protection to be afforded to the inventors. Those claims shall be deemed to include equivalent constructions insofar as they do not depart from the spirit and scope of the invention. It must be further noted that a plurality of the following claims may express, or be interpreted to express, certain elements as means for performing a specific function, at times without the recital of structure or material. As the law demands, any such claims shall be construed to cover not only the corresponding structure and material expressly described in this specification but also all legally-cognizable equivalents thereof.

We claim as deserving the protection of Letters Patent:

1. A convertible, all-terrain gear cart adapted for retaining and transporting cargo and for engaging a trailer hitch adapter retained by a vehicle wherein the trailer hitch adapter has a rigid tongue, the convertible, all-terrain gear cart comprising:
   a cargo bin with a first end, a second end, a first side, and a second side;
   a vehicle engaging member retained by the cargo bin wherein the vehicle engaging member has a distal end adjacent to the second end of the cargo bin adapted for being retained and supported by a trailer hitch receiver of a vehicle; and
   first and second wheels rotatably retained by the cargo bin wherein the first and second wheels have aligned, lateral axes of rotation;
   wherein the vehicle engaging member comprises a receiver and wherein the vehicle engaging member has an opening adapted to receive the rigid tongue of the trailer hitch adapter;
   wherein the vehicle engaging member has a shelf portion that extends distally beyond the opening adapted to receive the rigid tongue of the trailer hitch adapter whereby the shelf portion of the vehicle engaging member can be rested atop the rigid tongue of the trailer hitch adapter to permit the cargo bin to be pivoted using the rigid tongue as a fulcrum.

2. The gear cart of claim 1 wherein the first and second wheels are detachable from the cargo bin.

3. The gear cart of claim 1 wherein the cargo bin has a longitudinal centerline that communicates from the first end to the second end of the cargo bin and wherein the proximal segment of the control arm and the vehicle engaging member are disposed in alignment with the longitudinal centerline.

4. The gear cart of claim 1 further comprising first and second accessory attachment and retention structures, wherein the cargo bin is adapted to retain the first and second accessory attachment and retention structures to project from the cargo bin.

5. The gear cart of claim 4 wherein the first and second accessory attachment and retention structures comprise first and second cargo retention and roll bars and wherein the first and second cargo retention and roll bars are generally U-shaped with a central segment and first and second legs that project from the central segment.

6. The gear cart of claim 4 wherein each of the first and second accessory attachment and retention structures has first and second legs, wherein each leg terminates a tip segment and wherein tip receivers are disposed on the cargo bin in correspondence with the tip segments of the first and second legs of the first and second attachment and retention structures.

7. The gear cart of claim 6 wherein the cargo bin comprises a cargo cage formed by a plurality of frame portions of rigid members and wherein the tip receivers disposed on the cargo bin in correspondence with the tip segments of the legs of the first and second accessory attachment and retention structures comprise tip segments of frame portions of the rigid members that form the cargo cage.

8. The gear cart of claim 1 wherein the vehicle engaging member comprises a rigid sleeve of rectangular cross section.

9. The gear cart of claim 8 wherein the distal end of the vehicle engaging member is mitered to have a recessed lower portion and an overhanging upper portion that projects distally beyond the recessed lower portion to form the shelf portion.

10. The gear cart of claim 1 further comprising a trailer hitch adapter with a rigid tongue and wherein the opening of the vehicle engaging member and the rigid tongue have width dimensions greater than height dimensions.

11. The gear cart of claim 1 further comprising a control arm with a proximal segment coupled to the first end of the cargo bin and a distal segment.

12. A convertible, all-terrain gear cart comprising:
   a cargo bin with a first end, a second end, a first side, and a second side wherein the cargo bin comprises a cargo cage formed by a plurality of frame portions of rigid members to define an inner volume;
   a control arm with a proximal segment coupled to the first end of the cargo bin and a distal segment;
   a vehicle engaging member retained by the cargo bin wherein the vehicle engaging member has a distal end adjacent to the second end of the cargo bin adapted for being retained and supported by a trailer hitch receiver of a vehicle;
   first and second wheels rotatably retained by the cargo bin wherein the first and second wheels have aligned, lateral axes of rotation; and
   a cargo liner shaped and sized in correspondence to the inner volume defined by the cargo cage.

13. The gear cart of claim 12 wherein the cargo liner has an interior wall surface and further comprising plural pockets or sleeves spaced along the interior wall surface of the cargo liner.

14. The gear cart of claim 13 further comprising at least one cargo retention and roll bar wherein the cargo bin is adapted to retain the at least one cargo retention and roll bar to project from the cargo bin whereby elongate articles can be received by one of the pockets or sleeves and supported by the at least one cargo retention and roll bar.

15. The gear cart of claim 12 wherein the control arm is pivotally coupled to the cargo bin to be pivotable between a use position wherein the control arm extends from the cargo bin and a storage position wherein the control arm overlies the cargo bin.

16. The gear cart of claim 15 further comprising a trailer hitch connector retained by the distal segment of the control arm to enable the gear cart to be trailered by a trailering vehicle.

17. The gear cart of claim 16 wherein the distal segment of the control arm is disposed at an approximately 90-degree angle relative to the proximal segment of the control arm.

18. The gear cart of claim 12 wherein the vehicle engaging member comprises a receiver and further comprising a trailer hitch adapter for being retained by the vehicle wherein the trailer hitch adapter has a rigid tongue and wherein the vehicle engaging member has an opening adapted to receive the rigid tongue of the trailer hitch adapter.

19. A convertible, all-terrain gear cart comprising:
- a cargo bin with a first end, a second end, a first side, and a second side;
- a control arm with a proximal segment coupled to the first end of the cargo bin and a distal segment;
- a vehicle engaging member retained by the cargo bin wherein the vehicle engaging member has a distal end adjacent to the second end of the cargo bin adapted for being retained and supported by a trailer hitch receiver of a vehicle;
- first and second wheels rotatably retained by the cargo bin wherein the first and second wheels have aligned, lateral axes of rotation;
- first and second accessory attachment and retention structures, wherein the cargo bin is adapted to retain the first and second accessory attachment and retention structures to project from the cargo bin wherein the first and second accessory attachment and retention structures comprise first and second cargo retention and roll bars; and
- a plurality of retaining members spaced along each roll bar and a plurality of retaining straps adapted to engage the retaining members spaced along the roll bars.

20. The gear cart of claim 19 further comprising a support leg retained by the cargo bin.

21. The gear cart of claim 20 wherein the support leg is retractable with a retracted position adjacent to the cargo bin and an extended position wherein the support leg extends from the cargo bin.

22. A convertible, all-terrain gear cart comprising:
- a cargo bin with a first end, a second end, a first side, and a second side;
- a vehicle engaging member retained by the cargo bin wherein the vehicle engaging member has a distal end adjacent to the second end of the cargo bin adapted for being retained and supported by a trailer hitch receiver of a vehicle; and
- first and second wheels rotatably retained by the cargo bin wherein the first and second wheels have aligned, lateral axes of rotation;
- wherein the vehicle engaging member comprises a retaining post and wherein the retaining post has a body portion and a distal end with a shelf portion that extends distally beyond the body portion whereby the shelf portion of the vehicle engaging member can be rested within the trailer hitch receiver of the vehicle to permit the cargo bin to be pivoted using the trailer hitch receiver as a fulcrum.

23. The gear cart of claim 22 wherein the body portion of the retaining post has a lower portion and an upper portion and wherein the shelf portion extends distally from the lower portion of the retaining post beyond the upper portion of the retaining post.

24. The gear cart of claim 23 wherein the distal end of the retaining post is mitered to have a recessed upper portion and an extended lower portion that projects distally beyond the recessed upper portion to form the shelf portion.

25. The gear cart of claim 22 further comprising a control arm with a proximal segment coupled to the first end of the cargo bin and a distal segment.

26. A convertible, all-terrain gear cart comprising:
- a cargo bin with a first end, a second end, a first side, and a second side;
- a vehicle engaging member retained by the cargo bin wherein the vehicle engaging member has a distal end adjacent to the second end of the cargo bin adapted for being retained and supported by a trailer hitch receiver of a vehicle wherein the vehicle engaging member comprises a receiver;
- first and second wheels rotatably retained by the cargo bin wherein the first and second wheels have aligned, lateral axes of rotation;
- a trailer hitch adapter for being retained by the vehicle wherein the trailer hitch adapter has a rigid tongue;
- wherein the vehicle engaging member has an opening adapted to receive the rigid tongue of the trailer hitch adapter;
- wherein the trailer hitch adapter has a bar portion for being received into the trailer hitch receiver of the vehicle, wherein the trailer hitch adapter has a longitudinal centerline, and wherein the rigid tongue fixedly projects from the bar portion in parallel to but offset from the longitudinal centerline by a distance D whereby a relative height of the rigid tongue can be adjusted by a distance of twice the distance D by orienting the rigid tongue above or below the bar portion of the trailer hitch adapter.

27. The gear cart of claim 26 further comprising a control arm with a proximal segment coupled to the first end of the cargo bin and a distal segment.

28. A convertible, all-terrain gear cart comprising:
- a cargo bin with a first end, a second end, a first side, and a second side;
- a vehicle engaging member retained by the cargo bin wherein the vehicle engaging member has a distal end adjacent to the second end of the cargo bin adapted for being retained and supported by a trailer hitch receiver of a vehicle; and
- first and second wheels rotatably retained by the cargo bin wherein the first and second wheels have aligned, lateral axes of rotation;
- wherein the engaging member comprises a first sleeve extendably and retractably engaged with a second sleeve whereby the first sleeve can be extended distally to facilitate engagement with the trailer hitch receiver of the vehicle.

29. The gear cart of claim 28 further comprising a control arm with a proximal segment coupled to the first end of the cargo bin and a distal segment.

30. A convertible, all-terrain gear cart comprising:
- a cargo bin with a first end, a second end, a first side, and a second side;
- a control arm with a proximal segment coupled to the first end of the cargo bin and a distal segment;

a vehicle engaging member retained by the cargo bin wherein the vehicle engaging member has a distal end adjacent to the second end of the cargo bin adapted for being retained and supported by a trailer hitch receiver of a vehicle; and first and second wheels rotatably retained by the cargo bin wherein the first and second wheels have aligned, lateral axes of rotation;

wherein the control arm is pivotally coupled to the cargo bin to be pivotable between a use position wherein the control arm extends from the cargo bin and a storage position wherein the control arm overlies the cargo bin and wherein the distal segment of the control arm is adjustable in height relative to the cargo bin.

* * * * *